United States Patent
Hasegawa et al.

(10) Patent No.: US 6,756,135 B2
(45) Date of Patent: *Jun. 29, 2004

(54) SPIN VALVE THIN-FILM MAGNETIC ELEMENT

(75) Inventors: Naoya Hasegawa, Niigata-ken (JP); Kenji Honda, Niigata-ken (JP); Yoshihiko Kakihara, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/879,381

(22) Filed: Jun. 12, 2001

(65) Prior Publication Data

US 2002/0012812 A1 Jan. 31, 2002

(30) Foreign Application Priority Data

Jun. 13, 2000 (JP) ........................................ 2000-177472

(51) Int. Cl.[7] .............................. G11B 5/66; G11B 5/70; G11B 5/127; B32B 9/00; C25D 11/02
(52) U.S. Cl. ........................ 428/692; 428/693; 428/611; 428/629; 428/900; 360/313; 360/324.1; 360/324.11
(58) Field of Search ................................. 428/692, 611, 428/629, 900, 693; 360/313, 324.1, 324.11, 113; 324/252

(56) References Cited

U.S. PATENT DOCUMENTS

| | | | |
|---|---|---|---|
| 5,422,571 A | 6/1995 | Gurney et al. | 324/252 |
| 5,688,605 A | 11/1997 | Iwasaki et al. | 428/611 |
| 5,949,622 A | 9/1999 | Kamiguchi et al. | 360/113 |
| 6,181,534 B1 * | 1/2001 | Gill | 360/324.11 |
| 6,303,218 B1 * | 10/2001 | Kamiguchi et al. | 428/332 |
| 6,317,298 B1 * | 11/2001 | Gill | 360/324.11 |
| 6,369,993 B1 * | 4/2002 | Hayashi | 360/327.2 |
| 6,417,999 B1 * | 7/2002 | Knapp et al. | 360/322 |
| 2002/0012207 A1 * | 1/2002 | Singleton et al. | 360/324.1 |

OTHER PUBLICATIONS

Bach et al., "Thin Film Epitaxial Growth of the Heusler Alloy Cu2AlMn", Ruhr–University Bochum, Institute of Solid State Physics.*

* cited by examiner

*Primary Examiner*—Holly Rickman
(74) *Attorney, Agent, or Firm*—Brinks Hofer Gilson & Lione

(57) ABSTRACT

A spin valve thin-film magnetic element has an improved rate of change in resistance ($\Delta R/R$) that can be used for a narrower magnetic track. The spin valve thin-film magnetic element has a laminate that include an antiferromagnetic layer, a pinned magnetic layer, a non-magnetic conductive layer, a free magnetic layer, a back layer, specular-reflection layers and a pair of electrode layers formed at the two sides of the laminate. Preferably the specular reflection layer includes an oxide, such as $\alpha$-$Fe_2O_3$ or NiO, or a half-metal Heusler alloy, such as NiMnSb or PtMnSb.

25 Claims, 10 Drawing Sheets

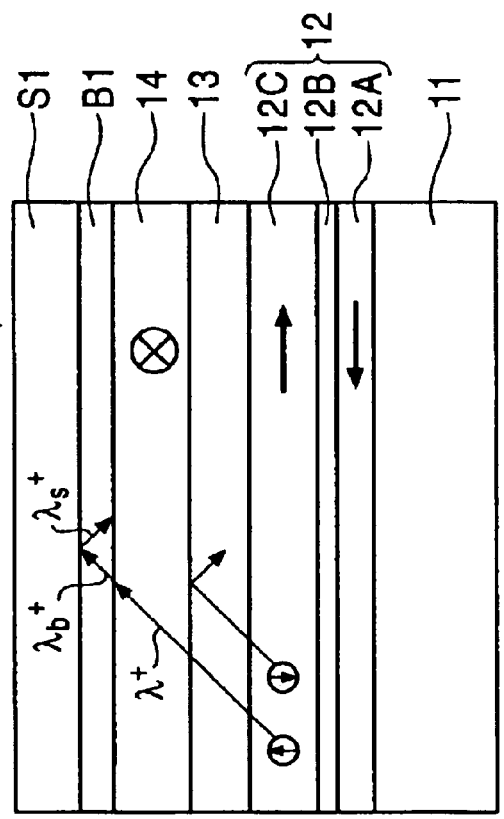
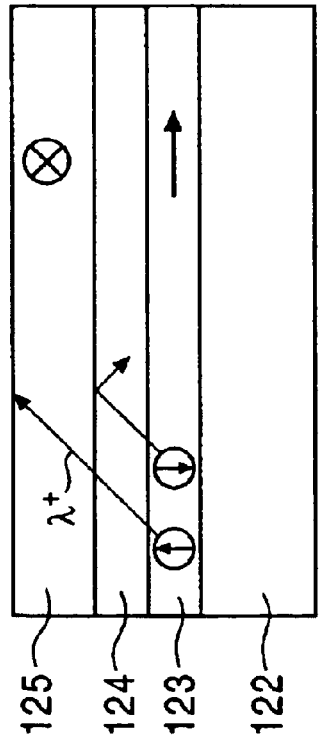
FIG. 5A
FIG. 5B

SPIN VALVE THIN-FILM MAGNETIC ELEMENT

BACKGROUND

The present invention relates to spin valve thin-film magnetic elements having an electrical resistance that is defined by the relationship between the fixed magnetization direction of a pinned magnetic layer and the magnetization direction of a free magnetic layer that is influenced by an external magnetic field. The present invention also relates to thin-film magnetic heads having spin valve thin-film magnetic elements. In particular, the present invention relates to a technique in which the soft magnetic characteristics of the free magnetic layer and the rate of change in resistance of a spin valve thin magnetic element is improved.

A spin valve thin-film magnetic element is a giant magnetoresistive (GMR) element having giant magnetoresistance effects. A spin valve thin film can detect magnetic fields recorded in a recording medium, such as a hard disk.

The spin valve thin-film magnetic element has a relatively simple structure among the GMR elements. Since the rate of change in resistance of a spin valve thin-film magnetic element is high in response to an external magnetic field, the spin valve thin-film magnetic element has superior characteristics in which its resistance changes in accordance with a weak magnetic field applied thereto.

FIG. 10 is a schematic cross-sectional view showing the structure of a conventional spin valve thin-film magnetic element observed from a side air bearing surface opposing a recording medium. Shield layers are formed on the upper and the lower sides of the spin valve thin-film magnetic element with gap layers disposed therebetween. The spin valve thin-film magnetic element, the gap layers, and the shield layers constitute a reproducing GMR head. In addition, on the reproducing GMR head, a recording inductive head may be provided. This GMR and inductive head on a trailing edge side portion of a floating type slider detects magnetic fields recorded in a magnetic recording medium, such as a hard disk.

The conventional spin valve thin-film magnetic element shown in FIG. 10 is a bottom type hard bias single spin valve thin-film magnetic element comprising a laminate composed of an antiferromagnetic layer 122, a pinned magnetic layer 123, a non-magnetic conductive layer 124, a free magnetic layer 125; and hard bias layers 129 positioned on the two sides of the laminate.

In this spin valve thin-film magnetic element, the moving direction of a magnetic recording medium, such as a hard disc, is in a Z direction in the figure, the direction of a leakage magnetic field is in a Y direction, and an X1 direction in the figure is a track width direction of the spin valve thin-film magnetic element.

The spin valve thin-film magnetic element shown in FIG. 10 is made of a laminate 120 having an underlying layer 121, the antiferromagnetic layer 122, the pinned magnetic layer 123, the non-magnetic conductive layer 124, the free magnetic layer 125, and a protective layer 127 layered from a bottom side in order. A pair of hard bias layers (permanent magnetic layers) 129 are positioned at the two sides of the laminate 120 and a pair of electrode layers 128 disposed on the hard bias layers 129 respectively. In general, a iron-manganese (Fe—Mn) alloy film, a nickel-manganese (Ni—Mn) alloy film, or a platinum-manganese (Pt—Mn) alloy film can be used for the antiferromagnetic layer 122. A nickel-iron (Ni—Fe) alloy film can be used for the pinned magnetic layer 123 and the free magnetic layer 125. A copper (Cu) film can be used for the non-magnetic conductive layer 124. A cobalt-platinum (Co—Pt) alloy film can be used for the hard bias layers 129. A chromium (Cr) film or a tungsten (w) film can be used for the electrode layers 128. In addition, the underlying layer 121 and the protective layer 127 can be made of a tantalum (Ta) film. In this spin valve, a magnetic recording track width Tw is determined by the width of the upper surface of the laminate 120.

The magnetization of the pinned magnetic layer 123 is placed in a single domain state in the Y direction (the direction of the leakage magnetic field from the recording medium, the height direction), as shown in FIG. 10, by the exchange anisotropic magnetic field generated by the exchange coupling at the interface with the antiferromagnetic layer 122. In addition, the magnetization of the free magnetic layer 125 is aligned in a direction opposite to the X1 direction by the influence of the bias magnetic field of the hard bias layers 129. That is, the magnetization of the pinned magnetic layer 123 and the magnetization of the free magnetic layer 125 are aligned perpendicular to each other.

In this spin valve thin-film magnetic element, a sense current is applied to the pinned magnetic layer 123, the non-magnetic conductive layer 124, and the free magnetic layer 125 from the electrode layers 128 formed on the hard bias layers 129. The leakage magnetic field is applied from the magnetic recording medium. When the magnetization of the free magnetic layer 125 is changed from the direction opposite to the X1 direction to the Y direction due to the relationship of the change in magnetization direction of the free magnetic layer 125 and the fixed magnetization direction of the pinned magnetic layer 123, the electrical resistance is changed (this change is called magnetoresistance (MR) effect), whereby the leakage magnetic field from the recording medium is detected by a change in voltage in accordance with the change in electrical resistance. In the spin valve thin-film magnetic element described above, the rate of change in resistance by an applied external magnetic field is approximately 8%.

For a recording medium, such as a hard disc, a higher recording density can be required. However, to improve the recording density, the magnetic recording track width can be decreased. That is, a narrower track can be required for the spin valve thin-film magnetic element. When the magnetic recording track width Tw is decreased, the track width for detecting an external magnetic field is decreased, and hence, the change in resistance (ΔR) by the GMR effect is decreased. Consequently, the detection sensitivity of the spin valve thin-film magnetic element is decreased, and a problem may arise in which a higher recording density is difficult to achieve. Accordingly, there is a need for a spin-valve thin film magnetic element having an 8% rate of change of resistance that has an improved detection sensitivity. In addition to the narrower track, there is a need for an improved sensitivity without increasing a gap size, i.e., without increasing the dimension in the Z direction shown in FIG. 10.

SUMMARY OF THE INVENTION

A spin valve thin-film magnetic element comprises a substrate; an antiferromagnetic layer disposed on the substrate, and a pinned magnetic layer disposed on the antiferromagnetic layer. Preferably, the magnetization direction of the pinned magnetic layer is fixed by an exchange coupling magnetic field with the antiferromagnetic layer. A non-magnetic conductive layer is positioned between the pinned magnetic layer and a free magnetic layer such that the magnetization direction of the free magnetic layer is aligned in a direction substantially perpendicular to the magnetization direction of the pinned magnetic layer. A pair of electrode layers supply a sense current to the pinned magnetic layer, the non-magnetic conductive layer, and the free magnetic layer and a bias layer to align the magnetization direction of the free magnetic layer in the direction substantially perpendicular to the magnetization direction of the pinned magnetic layer. A specular-reflection layer is positioned further from the non-magnetic conductive layer than the free magnetic layer which increases the free mean paths of conduction electrons by a specular effect. In a preferred embodiment, the film thickness of the free magnetic layer is preferably in the range of about 15 to about 45 Å.

The antiferromagnetic layer preferably comprises one of an X—Mn alloy and a Pt—Mn—X' alloy, in which X is one element selected from the group consisting of platinum (Pt), palladium (Pd), iridium (Ir), rhodium (Rh), ruthenium (Ru), and osmium (Os), and X' is at least one element selected from the group consisting of Pd, chromium (Cr), Ru, nickel (Ni), Ir, Rh, Os, gold (Au), silver (Ag), neon (Ne), argon (Ar), xenon (Xe), and krypton (Kr).

The specular-reflection layer preferably comprises an insulating material generating an energy gap having a high probability of producing specular reflection which conserves spin states of the conduction electrons. As the insulating material, an oxide, such as $\alpha\text{-Fe}_2\text{O}_3$, or NiO, or a half-metal Heusler alloy may be used. The film thickness of the specular-reflection layer is preferably in the range of about 10 to about 400 Å, and more preferably, in the range of about 10 to about 200 Å. The layers may also be disposed on a substrate in the following order, the antiferromagnetic layer, the pinned magnetic layer, the non-magnetic conductive layer, the free magnetic layer, and the specular-reflection layer.

In one preferred embodiment, the free magnetic layer and the specular-reflection layer may be separated by a back layer that preferably comprises a material selected from the group consisting of Au, Ag, and Cu. The thickness of the back layer is preferably in the range of about 5 to about 15 Å.

Preferably, the pinned magnetic layer comprises a multilayer film and at least one layer of the multilayer film comprise a half-metal Heusler alloy. In addition, the half-metal Heusler alloy preferably comprises at least NiMnSb or PtMnSb, and the layer comprising the half-metal Heusler alloy may be a monolayer film or a multilayer film.

The pinned magnetic layer may comprise a first pinned magnetic layer, a second pinned magnetic layer, and a non-magnetic interlayer positioned therebetween. The first and the second pinned magnetic layers may be in a ferrimagnetic state in which the magnetization directions are about 180° out of phase with each other.

The pair of electrode layers may be located near at least two sides of the free magnetic layer, non-magnetic conductive layer, and pinned magnetic layer in the film surface direction thereof. The pair of electrode layers may also be located further from the substrate than the antiferromagnetic layer.

Preferably, at least the antiferromagnetic layer, the pinned magnetic layer, the free magnetic layer, and the specular-reflection layer may comprise a laminate, and the pair of electrode layers is preferably provided near the two sides of the laminate. Preferably, the pair of electrode layers extend toward the laminate and are in direct contact with the free magnetic layer or back layer.

Furthermore, preferably a spin valve thin-film magnetic element comprises a substrate, an antiferromagnetic layer formed on the substrate, and a pinned magnetic layer in contact with the antiferromagnetic layer. Preferably, the magnetization direction of the pinned magnetic layer is fixed by an exchange coupling magnetic field with the antiferromagnetic layer. A non-magnetic conductive layer is preferably positioned between the pinned magnetic layer and a free magnetic layer, in which the magnetization direction of the free magnetic layer is aligned in a substantially perpendicular direction to the magnetization direction of the pinned magnetic layer. A pair of electrode layers preferably supply a sense current to the pinned magnetic layer, the non-magnetic conductive layer, the free magnetic layer, and a bias layer aligning the magnetization direction of the free magnetic layer in a substantially perpendicular direction to the magnetization direction of the pinned magnetic layer. Preferably, the pinned magnetic layer is a multilayer film, and at least one layer of the multilayer film comprises a half-metal Heusler alloy.

Preferably a thin-film magnetic head is provided with the spin valve thin-film magnetic element described above. Since the specular-reflection layer is positioned further from the non-magnetic conductive layer than the free magnetic layer, which increases the free mean paths of the conduction electrons by a specular effect, the free mean paths of the positive spin conduction electrons (spin-up conduction electrons) are increased which contributes to the magnetoresistance effect. Hence, a high rate of change in resistance ($\Delta R/R$) in the spin valve thin-film magnetic element can be attained. Preferably, a high recording density can be achieved.

The film thickness of the free magnetic layer is preferably in the range of about 15 to about 45 Å. A free magnetic layer having a thickness of less than about 15 Å is not preferable to the preferred embodiment since the free magnetic layer is difficult to form as a soft magnetic thin-film, a sufficient magnetoresistance effect cannot be obtained, and in addition, the rate of change in resistance is decreased due to the presence of conduction electrons which perform diffusive scattering and no specular reflection described later.

In addition, a free magnetic layer having a thickness of more than about 45 Å is also not preferable since spin-up conduction electrons are increased which are scattered before reaching the specular-reflection layer, and hence, the ratio of the rate of change in resistance improved by the specula effect is decreased.

In the spin valve thin-film magnetic element described above, the antiferromagnetic layer may comprise an alloy comprised of manganese (Mn) and at least one element selected from the group consisting of Pt, Pd, Rh, Ru, Ir, Os, Au, Ag, Cr, Ni, Ne, Ar, Xe, and Kr, or may comprise an alloy represented by the formula X—Mn in which X is one element selected from the group consisting of Pt, Pd, Ru, Ir, Rh, and Os, and in which X is preferably in the range of about 37 to about 63 atomic percent. In addition, in the spin valve thin-film magnetic element described above, the antiferromagnetic layer may comprise an alloy represented by the formula Pt—Mn—X' in which X' is at least one element selected from the group consisting of Pd, Cr, Ru, Ni, Ir, Rh, Os, Au, Ag, Ne, Ar, Xe, and Kr, and in which X'+Pt is preferably in the rage of about 37 to about 63 atomic percent.

Accordingly, when an antiferromagnetic layer is used which comprises an alloy represented by the formula X—Mn or an alloy represented by the formula Pt—Mn—X', compared to a spin valve thin-film magnetic element having an antiferromagnetic layer composed of a NiO alloy, a Fe—Mn alloy, a Ni—Mn alloy, or the like, a spin valve thin-film magnetic element can be produced having superior characteristics, such as a strong exchange coupling magnetic field, a high blocking temperature, and a superior corrosion resistance. Since the preferred specular-reflection layer comprises an insulating material generating an energy gap having a high probability of producing specular reflection which conserves spin states of conduction electrons, the rate of change in resistance can be improved by the specular effect described later.

As an insulating material forming the specular-reflection layer described above, there may be oxides, such as $\alpha$-$Fe_2O_3$, NiO, CoO, Co—Fe—O, Co—Fe—Ni—O, $Al_2O_3$, Al—Q—O in which Q is at least one element selected from the group consisting of boron (B), silicon (Si), nitrogen (N), titanium (Ti), vanadium (V), Cr, Mn, iron (Fe), cobalt (Co), and Ni, and R—O in which R is at least one element selected from the group consisting of Ti, V, Cr, Zr, Nb, Mo, Hf, Ta, and W; nitrides, such as Al—N, Al—Q—N in which Q is at least one element selected from the group consisting of B, Si, O, Ti, V, Cr, Mn, Fe, Co, and Ni, and R—N in which R is at least one element selected from the group consisting of Ti, V, Cr, Zr, Nb, Mo, Hf, Ta, and W; and the like.

When an antiferromagnetic material, such as $\alpha$-$Fe_2O_3$ or NiO, is used as the specular-reflection layer, the specular-reflection layer may also be used as the whole bias layer or a part thereof.

As an insulating material for forming the specular-reflection layer, a half-metal Heusler alloy may also be used, and the specular-reflection layer may be a monolayer or a multilayer comprised of a half-metal Heusler alloy comprising at least one of NiMnSb and PtMnSb. When these materials are used, a sufficient potential barrier between the specular-reflection layer and a layer adjacent thereto can be formed, and as a result, a sufficient specular effect can be obtained. In addition, the film thickness of the specular-reflection layer is preferably in the range of about 10 to about 400 Å, and more preferably, in the range of about 10 to about 200 Å.

A specular-reflection layer having a thickness of less than about 10 Å is not preferable since a continuous and uniform oxide film having a crystalline structure capable of forming a potential barrier cannot be obtained. As a result, the detection sensitivity is decreased, and hence, the reproducing output characteristics of the spin valve thin-film magnetic element are degraded.

In addition, a specular-reflection layer having a thickness of more than about 400 Å is not preferable since the specular-reflection layer serves as an antiferromagnetic layer, and as a result, an unexpected exchange coupling magnetic field (Hex) may be generated. Furthermore, when a thin-film magnetic head is formed, it is not preferable since the shield distance, i.e., a reproducing gap, is excessively increased, and as a result, the resolution of the head is degraded.

Since the back layer comprised of a non-magnetic conductive material selected from the group consisting of Au, Ag, and Cu is provided between the free magnetic layer and the specular-reflection layer, the mean free paths of positive spin (spin-up) conduction electrons are increased which contribute to the magnetoresistance effect. Consequently, a high rate of change in resistance ($\Delta R/R$) can be obtained in the spin valve thin-film magnetic element by a spin filter effect, and hence, a high recording density can be achieved.

The film thickness of the back layer is preferably in the range of about 5 to about 30 Å, and more preferably, in the range of about 5 to about 15 Å. A back layer having a thickness of less than about 5 Å is not preferable since the effect of increasing the free mean paths of positive (+) spin electrons is decreased. That is, the spin filter effect is decreased.

In addition, a back layer having a thickness of more than about 30 Å is not preferable since the ratio of a sense current shunting to the back layer composed of a non-magnetic conductive material is increased. Hence, a sense current flowing in the vicinity of the interface of the free magnetic layer and the non-magnetic conductive layer is decreased which can be needed for obtaining the GMR effect. That is, due to an increase in shunt loss, a high rate of change in resistance ($\Delta R/R$) is difficult to obtain.

Since the pinned magnetic layer is preferably comprised of a multilayer film, and at least one layer thereof is a monolayer or a multilayer comprised of a half-metal Heusler alloy comprising at least one of NiMnSb and PtMnSb, a specular effect can be obtained in a part of the pinned magnetic layer as is the case of the specular-reflection layer. Consequently, a higher rate of change in resistance ($\Delta R/R$) can be obtained in the spin valve thin-film magnetic element by an increase in free mean paths of the conduction electrons.

Since a ferromagnetic half-metal alloy, such as NiMnSb, or PtMnSb, is disposed between an upper and a lower ferromagnetic layer comprising the pinned magnetic layer, the magnetizations of the ferromagnetic layers in the vertical direction are in the same direction, the multilayer film behaves as if a monolayer film does although the multilayer film is actually a three-layered structure. Hence, stable magnetic characteristics can be obtained. Accordingly, a specular effect can be obtained in the state described above, and as a result, the rate of change in resistance can be improved.

In addition, a synthetic-ferri-pinned type spin valve thin-film magnetic element may be formed in which the pinned magnetic layer is formed of a first pinned magnetic layer and a second pinned magnetic layer with a non-magnetic interlayer provided therebetween and in which the magnetization directions of the first and the second pinned magnetic layers are antiparallel to each other so that the pinned magnetic layer is placed in a ferrimagnetic state. Accordingly, the exchange coupling magnetic field (an exchange anisotropic magnetic field) Hex generated at the interface of the antiferromagnetic layer and the first pinned magnetic layer can be increased. One of the first and the second pinned magnetic layers serves to fix the magnetization of the other pinned magnetic layer in an appropriate direction, and hence, the entire pinned magnetic layer is conserved in a very stable state.

In addition, when a spin valve thin-film magnetic element is formed having a pinned magnetic layer comprised of a first and a second pinned magnetic layers with a non-magnetic interlayer provided therebetween, the magnetostatic coupling fields of the first and the second pinned magnetic layers can counteract the demagnetizing field (the dipole magnetic field) by the fixed magnetization of the pinned magnetic layer. Accordingly, the influence of the demagnetizing field, generated by the fixed magnetization of the pinned magnetic layer, to the direction of the rotatable magnetization of the free magnetic layer can be decreased. Preferably, a layer comprised of the half-metal Heusler alloy described above may be provided at the non-magnetic conductive layer side than the non-magnetic interlayer. That is, the layer described above may be provided in contact with the second pinned magnetic layer or may be provided therein. As a result, a specular effect can be additionally obtained at a side further from the specular-reflection layer than the free magnetic layer. Hence, the rate of change in resistance can be increased.

The pair of electrode layers may be provided at least two sides of the free magnetic layer, the non-magnetic conductive layer, and the pinned magnetic layer in the film surface direction and may be disposed further from the substrate than the antiferromagnetic layer. As a result, the ratio of a sense current supplied in the vicinity of the free magnetic layer exhibiting the GMR effect can be increased without flowing through the antiferromagnetic layer and the bias layer, which have higher resistances compared to the free magnetic layer and the non-magnetic conductive layer. Hence, the rate of change in magnetic resistance in the spin valve thin-film magnetic element can be improved.

In addition, since a sense current can be supplied in the vicinity of the free magnetic layer from the electrode layers while conserving the single domain state of the free magnetic layer, side reading can be prevented, and a higher magnetic recording density can be more effectively achieved.

The principle of the giant magnetoresistance effect in the spin valve thin-film magnetic element will be described briefly. For the purposes of this description, the back layer and the specular-reflection layer are not in contact with the non-magnetic conductive layer adjacent to the free magnetic layer.

When a sense current is supplied to the spin valve thin-film magnetic element, conduction electrons can primarily move in the vicinity of the non-magnetic conductive layer having a low electrical resistance. In conduction electrons, it is highly probable that a substantially equal number of spin-up conduction electrons and spin-down conduction electrons are present.

The rate of change in magnetic resistance in the spin valve thin-film magnetic element has a positive relationship with the difference in free mean path between these two types of conduction electrons.

The spin-down conduction electrons are generally diffused at the interface of the non-magnetic conductive layer and the free magnetic layer regardless of the direction of an applied external magnetic field. The probability of moving into the free magnetic layer is maintained at a lower level, and the free mean paths of the spin-down conduction electrons are relatively short compared to those of the spin-up conduction electrons.

On the other hand, the spin-up conduction electrons have a higher probability of moving from the non-magnetic conductive layer to the free magnetic layer when the magnetization directions of the free magnetic layer and the pinned magnetic layer are parallel to each other by an external magnetic field. Hence, the free mean paths are increased. In addition, as the magnetization direction of the free magnetic layer rotates by an external magnetic field from a direction parallel to the magnetization of the pinned magnetic layer, the probability of scattering at the interface of the non-magnetic conductive layer and the free magnetic layer is increased. As a result, the free mean paths of the spin-up conduction electrons are decreased.

As described, by an application of an external magnetic field, the free mean paths of the spin-up conduction electrons can be changed compared to those of the spin-down conduction electrons. As a result, the difference in the free mean path therebetween is significantly changed. Accordingly, the resistivity is changed, and the rate of change in magnetic resistance ($\Delta R/R$) of the spin valve thin-film magnetic element is increased.

When the back layer is connected to the free magnetic layer, the spin-up conduction electrons moving in the free magnetic layer can move into the back layer, and the free mean paths of the spin-up conduction electrons can be increased in proportion to the thickness of the back layer. Accordingly, a spin filter effect can be obtained, the difference in free mean path between the conduction electrons is increased, and the rate of change in magnetic resistance ($\Delta R/R$) in the spin valve thin-film magnetic element can be improved.

In addition, when the specular-reflection layer is formed not in contact with the non-magnetic conductive layer adjacent to the free magnetic layer, the specular-reflection layer forms a potential barrier at the interface with the free magnetic layer and can reflect the spin-up conduction electrons moving in the free magnetic layer while conserving the spin states. Accordingly, the free mean paths of the spin-up conduction electrons can be increased, that is, a specular effect can be obtained. As a result, the difference in free mean path between the spin dependent conduction electrons is increased, and hence, the rate of change in magnetic resistance in the spin valve thin-film magnetic element is improved.

Furthermore, when the specular-reflection layer is formed on the surface opposite to the free magnetic layer of the back layer, the spin filter effect and the specular effect can be obtained simultaneously, and hence, the free mean paths of the spin-up conduction electrons can be increased. That is, the difference in free mean path between the spin dependent conduction electrons can be increased, and the rate of change in magnetic resistance can be improved.

The difference of the free mean paths by the back layer and the specular-reflection layer can be obtained when the free magnetic layer is relatively thin, and simultaneously, by controlling the film thicknesses of the layers that increase the free mean paths, the magnetization of the free magnetic layer is controlled. Hence, detection sensitivity and output characteristics of a spin valve thin-film magnetic element having a narrower track can be improved.

The spin valve thin-film magnetic element may comprise a bottom type single spin valve formed in the following order and comprising at least an antiferromagnetic layer, a pinned magnetic layer, a non-magnetic conductive layer, a free magnetic layer, and a vertical bias layer on a substrate side or surface. Alternatively, the spin valve thin-film magnetic element may comprise a top type single spin valve formed in the following order and comprise at least a vertical bias layer, a free magnetic layer, a non-magnetic conductive layer, a pinned magnetic layer, and an antiferromagnetic layer on a substrate or surface.

In addition, when a spin valve thin-film magnetic element is comprised of a free magnetic layer comprised of two films with a non-magnetic interlayer provided therebetween, the exchange coupling magnetic field is preferably generated between the two films comprising the free magnetic layer. Preferably, the free magnetic layer is in a ferrimagnetic state, and the magnetization direction of the free magnetic layer rotates in response to an external magnetic field.

BRIEF DESCRIPTION OF THE DRAWINGS

FIG. 5A is a schematic view illustrating a spin filter effect and a specular effect of a spin valve thin-film magnetic element shown in FIG. 10 having no back layer and no specular-reflection layer;

FIG. 5B is a schematic view illustrating a spin filter effect and a specular effect of the spin valve thin-film magnetic element shown in FIG. 1 provided with a back layer and a specular-reflection layer;

DESCRIPTION OF THE PRESENTLY PREFERRED EMBODIMENTS

A preferred embodiment of a spin valve thin-film magnetic element comprises a giant magnetoresistive (GMR) element that uses giant magnetoresistance effects. The spin valve thin-film magnetic element includes an edge portion positioned at a trailing side of a floating type slider within a hard disk. Preferably, the spin valve thin-film magnetic element detects magnetic fields recorded in a magnetic recording medium, such as a hard disk. The moving direction of the magnetic recording medium, such as a hard disk, is illustrated in the Z direction, and the direction of the leakage of the magnetic field from the magnetic recording medium is a illustrated in the Y direction.

Preferably, the spin valve thin-film magnetic element of the first embodiment is a bottom type spin valve thin-film magnetic element comprised of an antiferromagnetic layer, a pinned magnetic layer, a non-magnetic conductive layer, and a free magnetic layer disposed or deposited on a substrate side in order. Preferably, the pinned magnetic layer is comprised of a first pinned magnetic layer separated from a second pinned magnetic layer by a non-magnetic interlayer disposed therebetween. Preferably, the magnetization direction of the second pinned magnetic layer is antiparallel or not parallel to the first pinned magnetic layer. That is, the spin valve thin-film magnetic element of the first embodiment is a synthetic-ferri-pinned type single spin valve thin-film magnetic element in which the pinned magnetic layer is placed in a synthetic-ferri-pinned state.

Figure 1:
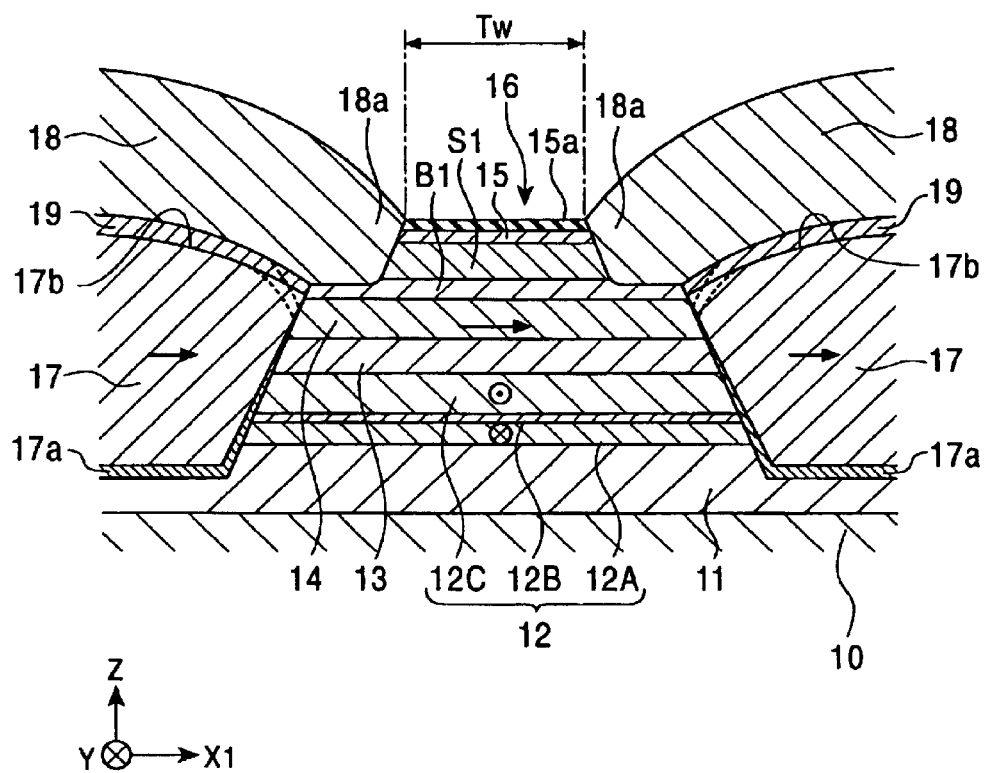
FIG. 1 is a cross-sectional view showing the structure of a spin valve thin-film magnetic element according to a first embodiment, which is illustrated from a side opposing a recording medium.
Figure 2:
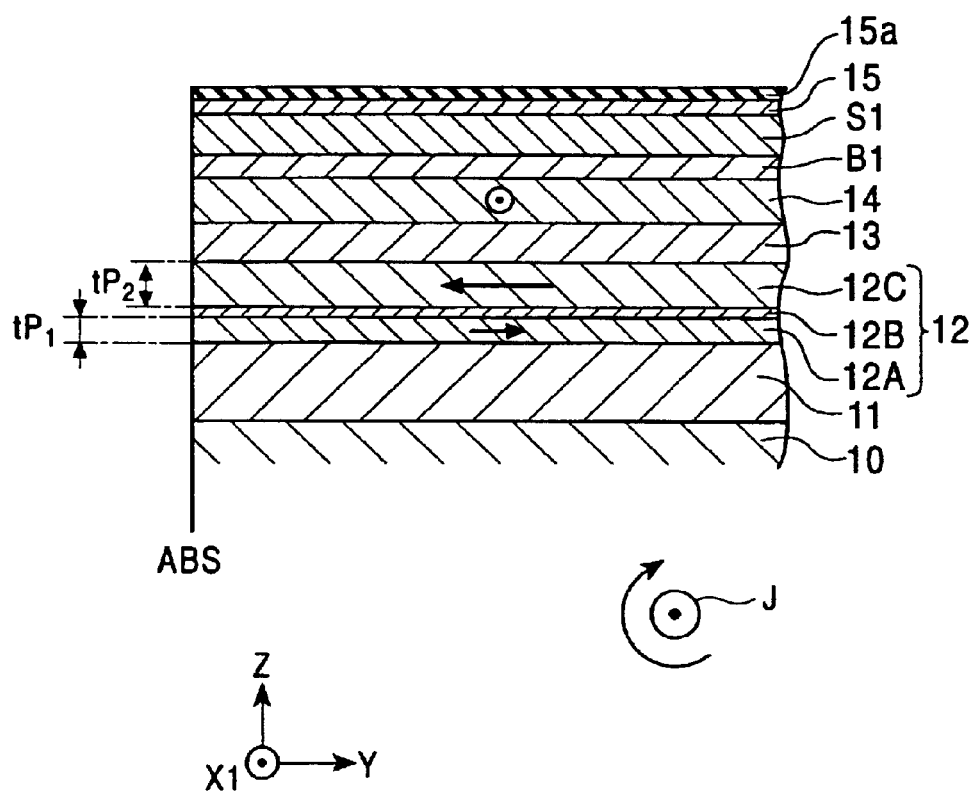
FIG. 2 is a cross-sectional view showing the structure of the spin valve thin-film magnetic element in the height direction according to the first embodiment.

In FIGS. 1 and 2, reference numeral 11 indicates an antiferromagnetic layer supported by a substrate 10. On the antiferromagnetic layer 11, pinned magnetic layers 12A, 12B, and 12C are supported. In the pinned magnetic layers 12A, 12B, and 12C, a first pinned magnetic layer 12A is separated from a second pinned magnetic layer 12C by a non-magnetic interlayer 12B disposed therebetween. Preferably, the magnetized direction of the second pinned magnetic layer 12C is aligned in an opposite direction or antiparallel to the first pinned magnetic layer 12A.

On the second pinned magnetic layer 12C, a non-magnetic conductive layer 13 comprised of Cu or the like and a free magnetic layer 14 is supported by the non-magnetic conductive layer 13. Preferably, the free magnetic layer 14, supports a back layer B1. A specular-reflection layer S1 comprised of an oxide, such as $\alpha$-$Fe_2O_3$ or NiO, for example, is supported by the back layer B1. A protective layer 15 comprised of Ta or the like is supported by the specular-reflection layer S1, and the upper side of the protective layer 15 supports an oxide layer 15a comprised of a tantalum oxide (a Ta-oxide).

As shown in FIG. 1, a laminate 16 having a substantially trapezoidal cross-section is supported by individual layers disposed between the antiferromagnetic layer 11 and the oxide layer 15a. In addition, reference number 17 identifies hard bias layers (bias layers), and reference number 18, identifies electrode layers.

Preferably, the hard bias layers 17 are supported by the antiferromagnetic layer 11. Preferably, the hard bias layers 17 extend to the two sides of the laminate 16. Preferably, electrode layers 18 are supported by interlayers 19 comprised of Ta or Cr disposed on the hard bias layer 17. Preferably, the underlying layers 17a are disposed below the hard bias layer 17.

When a bottom type structure is formed as described, the ratio of a sense current received by the laminate 16 is increased without flowing through the antiferromagnetic layer 11 that preferably has a high resistivity. Accordingly, side reading can be substantially prevented, and hence, preferably a higher magnetic recording density can be more effectively achieved. In addition, when overlay portions 18a of the electrode layers 18 are in contact with portions of the back layer B1, the contact resistance can be decreased, and hence, a shunt current component flowing from the hard bias layers 17 to the bottom side of the laminate 16 can be decreased.

In the spin valve thin-film magnetic element of the first embodiment, the antiferromagnetic layer 11 preferably has a thickness of about 80 to about 300 Å at a central portion of the laminate 16 and preferably is comprised of an alloy comprising Mn and at least one element selected from the group consisting of Pt, Pd, Ir, Rh, Ru, Os, Au, Ag, Cr, Ni, Ne, Ar, Xe, and Kr. Preferably, the antiferromagnetic layer 11 comprised of the alloy described above has a superior heat resistance, corrosion resistance, a high blocking temperature, and a strong exchange coupling magnetic field (an exchange anisotropic magnetic field).

In addition, an alloy represented by the formula X—Mn may replace the Pt—Mn alloy described above, (in which X is one element selected from the group consisting of Pd, Ru, Ir, Rh, and Os) or an alloy represented by the formula X'—Pt—Mn (in which, X' is at least one element selected from the group consisting of Pd, Ru, Ir, Rh, Os, Au, Ag, Cr, Ni, Ne, Ar, Xe, and Kr) may be used. In the Pt—Mn alloy and the alloy represented by the formulas X—Mn, the Pt or the X is preferably in the range of about 37 to about 63 atomic percent, and more preferably, in the range of about 47 to about 57 atomic percent. In this preferred embodiment, the upper limit and the lower limit in the range represented by "to" preferably indicates "not more than" and "not less than", respectively, unless stated otherwise.

Furthermore, in the alloy represented by the formula of X'—Pt—Mn, the X'—Pt is preferably in the range of about 37 to about 63 atomic percent, and more preferably, in the range of about 47 to about 57 atomic percent. In addition, in the alloy represented by the formula X'—Pt—Mn, the X' is preferably in the range of about 0.2 to about 10 atomic percent. However, when X' is at least one of Pd, Ru, Ir, Rh, and Os, the X' is preferably in the range of about 0.2 to about 40 atomic percent.

Preferably, by using an alloy having the appropriate composition described above and by annealing the alloy, an antiferromagnetic layer 11 can be obtained which generates a strong exchange coupling magnetic field. In particular, when a Pt—Mn alloy is used, a superior antiferromagnetic layer 11 can be obtained which has an exchange coupling magnetic field of about 48 kA/m or more, for example, about 64 kA/m or more, and which has a significantly high blocking temperature of about 380° C., which is a temperature at which the exchange coupling magnetic field disappears.

These films comprised of the alloys preferably each have an irregular face centered cubic structure (fcc: the lattice factors of the a-axis and the c-axis are the same), and after a heat treatment is performed thereon, the structures are each changed to a CuAuI type regular face centered cubic structure (fct: the lattice factor of the a-axis to that of the c-axis is approximately 0.9 to 1).

As shown in FIGS. 1 and 2, the pinned magnetic layer 12 is comprised of the first pinned magnetic layer 12A and the second pinned magnetic layer 12C separated by the non-magnetic interlayer 12B therebetween. Preferably, the magnetized direction of the second pinned magnetic layer 12C is aligned not parallel to or antiparallel to the first pinned magnetic layer 12A.

The first and the second pinned magnetic layers 12A and 12C are thin films comprised of a ferromagnetic material, such as Co, a Ni—Fe alloy, a Co—Ni—Fe alloy, a Co—Fe alloy, or a Co—Ni alloy. In addition, since a magnetic film thickness $tP_2$ of the second pinned magnetic layer 12C is preferably larger than a magnetic film thickness $tP_1$ of the first pinned magnetic layer 12A, the second pinned magnetic layer 12C has a larger magnetic moment than the first pinned magnetic layer 12A. In addition, the first pinned magnetic layer 12A and the second pinned magnetic layer 12C preferably have different magnetic moments than each other. Accordingly, the magnetic film thickness $tP_1$ of the first pinned magnetic layer 12A can be larger than the magnetic film thickness $tP_2$ of the second pinned magnetic layer 12C.

The first pinned magnetic layer 12A is preferably in contact with the antiferromagnetic layer 11. Through an annealing (a heat treatment) in a magnetic field, an exchange coupling magnetic field (the exchange anisotropic magnetic field) is generated at the interface of the first pinned magnetic layer 12A and the antiferromagnetic layer 11. Preferably, the magnetization of the first pinned magnetic layer 12A is fixed in, for example, a Y direction as shown in FIGS. 1 and 2, i.e., in the opposite direction to the magnetic recording medium (the height direction). When the magnetization of the first pinned magnetic layer 12A is fixed in the Y direction, the magnetization of the second pinned magnetic layer 12C separated by the non-magnetic interlayer 12B, is fixed in an antiparallel direction to the first pinned magnetic layer 12A (a ferrimagnetic state). That is, the magnetization of the second pinned magnetic layer 12C is fixed in an opposite direction to the Y direction as shown in FIG. 2.

When the exchange coupling magnetic field is increased, the magnetization of the first pinned magnetic layer 12A and that of the second pinned magnetic layer 12C can be maintained more stably in an antiparallel state. In particular, when a Pt—Mn alloy is used for the antiferromagnetic layer 11, a high blocking temperature and a strong exchange coupling magnetic field (exchange anisotropic magnetic field) at the interface with the first pinned magnetic layer 12A is created. The Pt—Mn alloy preferably creates a stable magnetic state between the first and the second pinned magnetic layers 12A and 12C that is thermally maintained.

In this preferred embodiment, by controlling the ratio of the film thickness of the first pinned magnetic layer 12A to that of the second pinned magnetic layer 12C in an appropriate range, the exchange coupling magnetic field (Hex) can be increased, a stable antiparallel state (a ferrimagnetic state) of the magnetizations of the first pinned magnetic layer 12A and the second pinned magnetic layer 12C can be thermally maintained, and the rate of change in resistance ($\Delta R/R$) can be maintained to a level that is approximately equivalent to a conventional rate. Furthermore, by controlling the strength and direction of the magnetic field during annealing, the magnetization directions of the first and the second pinned magnetic layers 12A and 12C can be set in predetermined directions. The non-magnetic conductive layer 13 is preferably comprised of Cu or the like, and the film thickness is preferably within the range of about 20 to about 25 Å.

The free magnetic layer 14 is preferably about 20 to about 50 Å thick and is preferably comprised of the same material that comprises the pinned magnetic layer 12.

The back layer B1 is preferably comprised of a non-magnetic conductive material or a metal material, such as Cu, and may be comprised of a material selected from the group consisting of Au, Ag, or Cu. The back layer B1 preferably has a thickness of about 5 to about 15 Å, for example.

Preferably, the mean free paths of spin-up electrons contributing to the magnetoresistance effect are increased near the back layer B1, and by a spin filter effect, a high rate of change in resistance ($\Delta R/R$) is obtained, which creates a high recording density.

The film thickness of the back layer B1 is preferably within the range of about 5 to about 30 Å, and more preferably, in the range of about 5 to about 15 Å. In the preferred embodiment, preferably the thickness of the back layer B1 is not less than about 5 Å. Since the effect of increasing the mean free paths $\lambda^+$ of the spin-up electrons is decreased, the rate of change in resistance cannot be improved by the spin filter effect.

On the other hand, the thickness of the back layer B1 is preferably not more than 15 Å in the preferred embodiment, since the ratio of a sense current J shunted to the back layer B1 comprised of a non-magnetic conductive material is increased. As a result, a sense current required for obtaining the GMR effect is decreased flowing in the vicinity of the interface of the free magnetic layer 14 and the non-magnetic conductive layer 13. That is, it is not preferable to have a thickness greater than about 150 Å since the shunt loss is increased, and hence, a high rate of change in resistance ($\Delta R/R$) is difficult to obtain. In addition, even if specular reflection is performed on a specular-reflection layer S1, it is not preferable to have a thickness greater than 150 Å since conduction electrons performing typical diffusive scattering are increased, and as a result, the rate of change in resistance is decreased.

The specular-reflection layer S1 is preferably positioned on the back layer B1 as an increasing layer for increasing the free mean paths of the conduction electrons by a specular effect, which increases the mean free paths of the +spin conduction electrons (the spin-up electrons) contributing to the magnetoresistance effect. Accordingly, a high rate of change in resistance (ΔR/R) can be obtained in the spin valve thin-film magnetic element by a specular effect, and as a result, a high recording density can be achieved.

The film thickness of the specular-reflection layer S1 is preferably set in the range of about 10 to about 400 Å, and more preferably, in the range of about 10 to about 200 Å. In this preferred embodiment the film thickness of the specular-reflection layer S1 should not be less than about 10 Å, since a continuous and a uniform film composed of an oxide cannot be formed having a crystalline structure capable of forming a potential barrier, and as a result, a sufficient specular effect cannot be obtained.

In addition, as the film thickness of the specular-reflection layer S1 is increased, similar to the antiferromagnetic layer 11, the specular-reflection layer 11 has a higher probability of serving as an antiferromagnetic film, and as a result, an unexpected exchange coupling magnetic field (Hex) may be generated in some embodiments. Accordingly, in this preferred embodiment it is not preferable that the film thickness of the specular-reflection layer S1 exceed a predetermined value. In addition, when a thin-film magnetic head is formed through a specular-reflection layer S1 having a larger film thickness, a shield distance created by a reproducing gap is increased excessively, and the resolution of the head can be undesirably degraded.

When the structure is formed as described-above, the specular-reflection layer S1 forms a potential barrier in near the interface with the back layer B1 and can reflect the spin-up conduction electrons moving through the free magnetic layer 14 and the back layer B1 near the interface while conserving the spin states of the conduction electrons. Accordingly, the free mean paths of the spin-up conduction electrons can be increased more, and a specular effect can be observed.

When a potential barrier is formed at the interface between the back layer B1 and the specular-reflection layer S1 to reflect the conduction electrons while conserving the spin states thereof, preferably the specular-reflection layer S1 is comprised of an electrically insulating material since the free magnetic layer 14 and the back layer B1 are superior electrical conductors.

As an insulating material which can meet the requirement for the specular-reflection layer described above, an oxide is preferably used, and for example, oxide films may be comprised of $\alpha$-$Fe_2O_3$, NiO, CoO, Co—Fe—O, Co—Fe—Ni—O, $Al_2O_3$, Al—Q—O (in which Q is at least one selected from the group consisting of B, Si, N, Ti, V, Cr, Mn, Fe, Co, an Ni), or R—O (in which R is at least one selected from the group consisting of Ti, V, Cr, Zr, Nb, Mo, Hf, Ta, and W). By using the oxide insulating material described above, the specular-reflection layer S1 can be formed. In addition, a nitride film, such as Al—N, Al—Q—N (in which Q is at least one selected from the group consisting of B, Si, O, Ti, V, Cr, Mn, Fe, Co, and Ni), R—N (in which R is at least one selected from the group consisting of Ti, V, Cr, Zr, Nb, Mo, Hf, Ta, and W), or the like may be used, and the advantages equivalent to those obtained by the oxide material described above can be obtained.

Furthermore, when the specular-reflection layer S1 is comprised of an antiferromagnetic material, such as $\alpha$-$Fe_2O_3$, or NiO, the specular-reflection layer S1 may also be used as the bias layers 17 which align the magnetization of the free magnetic layer 14 in the X1 direction in the figure.

The protective layer 15 is comprised of Ta, the surface thereof is comprised of an oxide layer 15a, the protective layer 15 and the specular-reflection layer Si are each formed so that the distance between the two edges thereof in a track width direction (the X1 direction in FIG. 2) is shorter than the upper surface of the back layer B1, and the back layer B1 is exposed at the two sides of the upper part of the laminate 16.

The bias underlying layer 17a comprised of Cr or the like, which is used as a buffer film and an alignment film, preferably has a thickness of, for example, of about 20 to about 50 Å, and more preferably, about 35 Å. The interlayer 19 approximately 50 Å thick is preferably comprised of Ta or the like. The bias underlying layer 17a and the interlayer 19 serve as diffusion barriers for preventing the magnetic characteristics of the hard bias layers 17 from being degraded. The degradation mentioned above may occur by thermal diffusion between the hard bias layers 17 and the layers adjacent thereto when the hard bias layers 17 are exposed to a high temperature condition during a curing step (UV curing or hard baking) of curing an insulating resist in a subsequent process for manufacturing an inductive head (a recording head) or the like.

Figure 3:
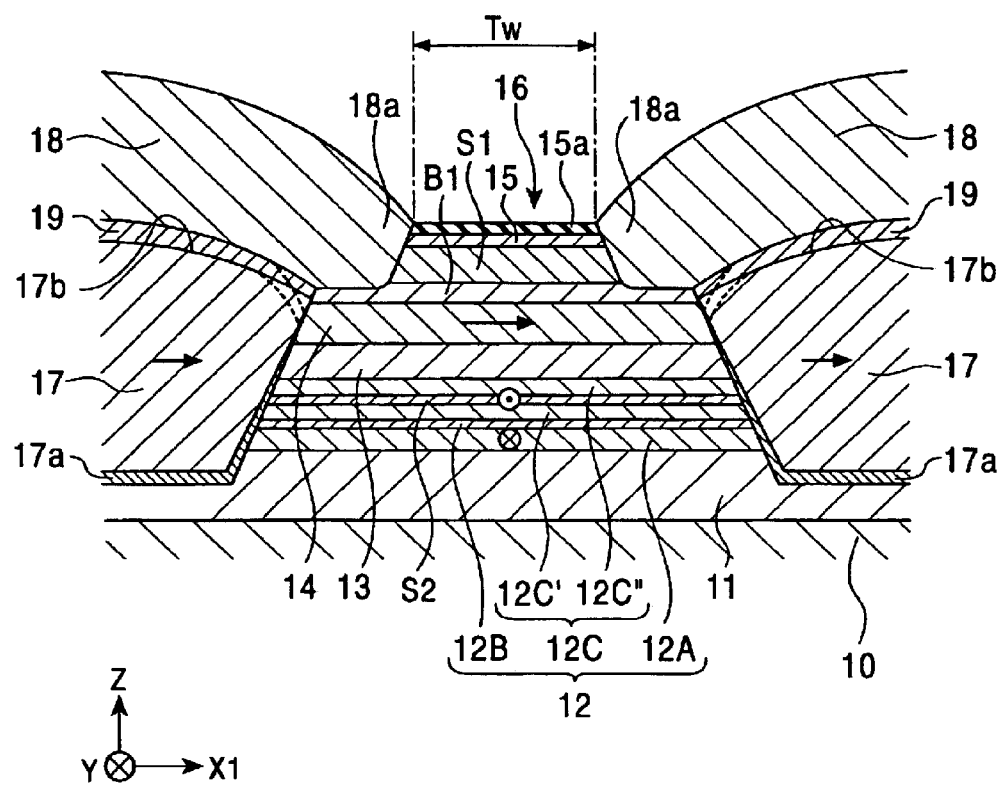
FIG. 3 is a cross-sectional view showing the structure of a spin valve thin-film magnetic element according to a second embodiment, which is illustrated from a side opposing a recording medium.

The hard bias layers 17 have a thickness of about 200 to about 500 Å and are comprised of a Co—Pt alloy, a Co—Cr—Pt alloy, a Co—Cr—Ta alloy, or the like. In addition, since the hard bias layers 17 are magnetized in the X1 direction as shown in FIG. 3, the magnetization of the free magnetic layer 14 is aligned in the X1 direction. Accordingly, the rotatable magnetization of the free magnetic layer 14 and the fixed magnetization of the second pinned magnetic layer 12C are perpendicular to each other.

Preferably, a portion hard bias layers 17 are disposed at the same level as the free magnetic layer 14, and the thickness of the hard bias layers 17 are preferably greater than that of the free magnetic layer 14 in a thickness direction. In addition, the upper surfaces 17b of the hard bias layers 17 are disposed further from the substrate 10 than the upper surface 14A of the free magnetic layer 14 (that is, the upper side in FIG. 1), and the bottom surfaces of the hard bias layers 17 are disposed closer to the substrate 10 side than the bottom surface of the free magnetic layer 14 (that is, the lower side in FIG. 1).

Furthermore, it is preferable that the contact points between the upper surfaces 17b of the hard bias layers 17 and the side surfaces of the laminate 16 be closer to the substrate 10 sides (that is, lower side in FIG. 1) than the upper edges 16a of the side surfaces of the laminate 16. Preferably, the contact points are located at positions lower than the topmost positions of the hard bias layers 17 which are distant from the laminate 16 (that is, the two side edges of the upper surfaces 17b of the hard bias layers 17 in FIG. 1). Accordingly, flux control in the magnetic field acting from the hard bias layers 17 on the free, magnetic layer 14 occurs. That is, the leakage flux from the hard bias layers 17, is not absorbed as much in an upper shield layer and the like located above the laminate 16. Hence, the effective magnetic field applied to the free magnetic layer 14 is unlikely to decrease. As a result, the free magnetic layer 14 is easily placed in a single domain state, and preferably the domain control in the free magnetic layer 14 can be performed.

The electrode layers 18 extend to the back layer B1 exposed at the upper side of the laminate 16 and form the overlay portions 18a. Preferably, these overlay portions 18a, are in contact with the laminate 16, and thus, connected to the back layer B1. Since the electrode layers 18 are each comprised of a single film or a multilayer film comprised of at least one element selected from the group consisting of Cr, Au, Ta, and W, the resistance of the electrode layers can be decreased. In this preferred embodiment, since the electrode layers 18 are comprised of Cr and are formed over the interlayer 19 comprised of Ta, the electrical resistance can be decreased. Preferably, a track width Tw is determined in the track width direction (the X1 direction in FIG. 1) of the upper surface of the laminate 16 at which the overlay portions 18a are not formed.

Accordingly, the ratio of the sense current supplied from the electrode layers 18 to the laminate 16 can be increased since the sense current can be supplied directly to the laminate 16 without passing through the hard bias layers 17 and the like having a high resistivity. In addition, since the contact area between the laminate 16 and the electrode layers 18 can be increased, the contact resistance having no contribution to the magnetoresistance effect can be decreased, and the reproducing characteristics of the device can be improved. In this embodiment, the structure may also be used in which the electrode layers 18 do not extend to the upper surface of the back layer B1.

In the spin valve thin-film magnetic element shown in FIGS. 1 and 2, a sense current J is supplied from the electrode layers 18 to the laminate 16. When the magnetic field is applied in the Y direction shown in FIGS. 1 and 2 from the magnetic recording medium, the magnetization of the free magnetic layer 14 is rotated from the X1 direction in the figure to the Y direction. In this stage, since scattering of spin dependent conduction electrons occurs due to a GMR effect at the interfaces of the non-magnetic conductive layer 13 with the free magnetic layer 14 and the second pinned magnetic layer 12C, the electrical resistance is changed. Hence, the leakage magnetic field from the recording medium can be detected.

In the embodiment described above, the free mean paths of the +spin (spin-up) electrons contributing to the magnetoresistance effect are increased by the back layer B1, and a high rate of change in resistance ($\Delta R/R$) can be obtained in the spin valve thin-film magnetic element by a spin filter effect, whereby a higher recording density can be achieved.

Simultaneously, the free mean paths of the +spin (spin-up) electrons contributing to the magnetoresistance effect are increased by the specular-reflection layer S1, and a high rate of change in resistance ($\Delta R/R$) can be obtained in the spin valve thin-film magnetic element by a specular effect, whereby a higher recording density can be achieved.

Figure 10:
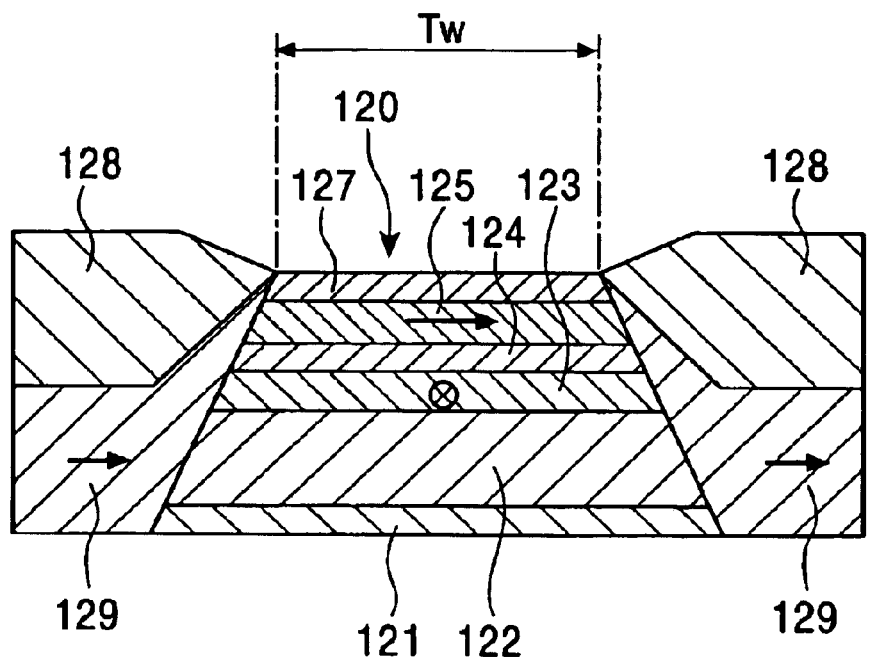
FIG. 10 is a cross-sectional view showing an example of a conventional thin-film magnetic device, illustrated from a side opposing a recording medium.
Figure 10:
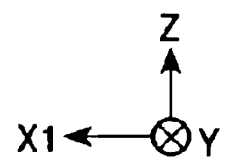

FIGS. 5A and 5B are schematic views illustrating the spin filter effect and the specular effect in a spin valve thin-film magnetic element. FIG. 5A is a schematic view of the structure shown in FIG. 10 having no back layer and no specular-reflection layer. FIG. 5B is a schematic view of the structure shown in FIG. 1 having the back layer and the specular-reflection layer.

The giant magnetoresistance (GMR) effect observed in a magnetic material is primarily produced by "spin dependent scattering" of electrons. That is, the GMR effect is produced by using the difference between the free mean paths $\lambda^+$ of conduction electrons having spin (for example, spin-up) parallel to the magnetization direction of the magnetic material, i.e., the free magnetic layer 14 in this case, and the free mean paths $\lambda^-$ of conduction electrons having spin (for example, spin-down) antiparallel to the magnetization direction of the magnetic material. In these figures, a spin-up conduction electron is represented by an upward arrow, and a spin-down conduction electron is represented by a downward arrow.

In the case in which an electron passes through the free magnetic layer 14, an electron having +spin parallel to the magnetization direction of the free magnetic layer 14 can move freely. On the other hand, an electron having −spin is immediately scattered.

The reason for this is that the free mean path $\lambda^+$ of the electron having +spin is, for example, approximately 50 Å, and the free mean path $\lambda^-$ of the electron having −spin is approximately 6 Å. That is, the free mean path $\lambda^-$ is extremely small, such as about one-tenth of the free mean path $\lambda^+$.

In this embodiment, preferably the film thickness of the free magnetic layer 14 is larger than the free mean path $\lambda^-$ of the −spin electron, i.e., approximately 6 Å, and is smaller than the free mean path $\lambda^+$ of the +spin electron, i.e., approximately 50 Å.

Accordingly, when electrons pass through the free magnetic layer 14, −spin conduction electrons (minority carriers) are effectively blocked by the free magnetic layer 14 (that is, filter out), and on the other hand, +spin conduction electrons (majority carriers) naturally pass through the free magnetic layer 14 in a transmissive manner.

The majority carriers and the minority carriers generated in the second pinned magnetic layer 12C, that is, the +spin electrons and the −spin electrons corresponding to the magnetization direction of the second pinned magnetic layer 12C, move toward the free magnetic layer 14. That is these electrons become carriers for carrying charges.

These carriers are scattered in different manners from each other when the magnetization of the free magnetic layer 14 rotates. That is, since the carriers pass through the free magnetic layer 14 in different ways from each other, the GMR effect described above can be obtained.

Electrons moving from the free magnetic layer 14 toward the second pinned magnetic layer 12C also contribute to the GMR effect. However, when the electrons moving from the free magnetic layer 14 toward the second pinned magnetic layer 12C and the electrons moving from the second pinned magnetic layer 12C toward the free magnetic layer 14 counteract each other, the electrons move in one direction, and hence, the description therefor is omitted. In addition, in electrons generated in the non-magnetic conductive layer 13, the number of +spin electrons and the number of −spin electrons are about equal to each other. Hence, the sum of the free mean paths is not changed. Accordingly, the description therefor is omitted.

The number of the minority carriers which are generated in the second pinned magnetic layer 12C and which pass through the non-magnetic conductive layer 13, that is, the number of the −spin electrons, is about equal to the number of −spin electrons scattered at the interface of the second pinned magnetic layer 12C and the non-magnetic conductive layer 13. These −spin electrons are scattered in the vicinity of the interface of the second pinned magnetic layer 12C and the non-magnetic conductive layer 13, which is far from the surface of the free magnetic layer 14 in contact with the non-magnetic conductive layer 13. That is, even when the magnetization direction of the free magnetic layer 14 rotates, the free mean paths of these −spin electrons are not changed and are still very small compared to those of the +spin electrons. Accordingly, the change in resistance is not influenced which contributes to the rate of change in resistance, that is, to the GMR effect. Accordingly, the behavior of the +spin electrons may only be considered for the GMR effect.

The majority carriers generated in the second pinned magnetic layer 12C, i.e., the +spin electrons, pass through the non-magnetic conductive layer 13 having a thickness smaller than the free mean path $\lambda^+$ of the +spin electron and reach the free magnetic layer 14.

When an external magnetic field is not applied to the free magnetic layer 14, the magnetization direction thereof is not rotated, and since the majority carriers have +spin which is parallel to the magnetization direction of the free magnetic layer 14, the majority carriers can freely pass therethrough.

As shown in FIG. 5B, the +spin electron passing through the free magnetic layer 14 moves an additional free mean path $\lambda^+_b$ in the back layer B1, which is determined by the properties of the material. In one conventional case in which no back layer B1 is provided, as shown in FIG. 5A, the +spin electron passes through a free magnetic layer 125 and is then scattered at the upper surface thereof. However, compared to the preferred embodiment described above, when the back layer B1 is provided, the free mean path increases by the additional free mean path $\lambda^+_b$. Accordingly, by using a conductive material having a relatively low resistance (that is, a longer free mean path), the resistance of the spin valve thin-film magnetic element is decreased.

In the case in which the specular-reflection layer S1 is not provided, the +spin electron passes through the back layer B1 and is scattered at the upper surface. As a result, the free man path is $\lambda^+ + \lambda^+_b$ as shown in FIG. 5A. When the specular-reflection layer S1 is provided, a potential barrier is formed in the vicinity of the interface of the back layer B1 and the specular-reflection layer S1, and then the +spin electron performs specular reflection (specular scattering) near the interface of the back layer B1 and the specular-reflection layer S1.

When a conduction electron performs diffusion scattering, the spin state (energy, quantum state, and the like) of the electron is changed, and the information of the spin state of the electron is lost. However, in the case of specular reflection, the probability is high that the +spin electron is reflected while conserving the spin state, such as energy, quantum state, and the like, and the electron moves again in the back layer B1. That is, by specular reflection, the conduction electron moves in the back layer B1 while conserving the spin state thereof as if the conduction electron is not reflected. Accordingly, as shown in FIG. 5B, the free mean path of the +spin electron increases by a reflection free mean path $\lambda^+_s$ by virtue of the specular reflection.

As described, by providing the specular-reflection layer S1, the free mean path of the +spin electron increases by the reflection free mean path $\lambda^+_s$, and hence, the free mean path of the +spin electron is significantly increased to $\lambda^+ + \lambda^+_b + \lambda^+_s$ as shown in FIG. 5B. That is, when the specular-reflection layer S1 is provided, a relatively low resistance (that is, a long free mean path) is obtained, and the resistance of the spin valve thin-film magnetic element is decreased.

In addition, when the magnetization direction of the free magnetic layer 14 is rotated by applying an external magnetic field, the magnetization direction of this magnetic material and the spin direction are different from each other, and hence, the +spin electrons are scattered in the free magnetic layer 14. That is, in accordance with the magnetization direction of the free magnetic layer 14, the probability is increased in that the +spin electrons have the free mean paths equivalent to those of the −spin electrons (spin-down electrons). As a result, the effective free mean paths are rapidly decreased. That is, the resistance is rapidly increased. Accordingly, in accordance with the presence or the absence of an external magnetic field applied to the free magnetic layer 14, the resistance of the spin valve thin-film magnetic element is changed. Hence, the GMR effect can be obtained.

As a result, compared to the case in which the back layer B1 and the specular-reflection layer S1 are not provided, a GMR effect having a high rate of change in resistance ($\Delta R/R$) can be observed, and the reproducing characteristics of the spin valve thin-film magnetic element can be improved.

As described, since the spin valve thin-film magnetic element of this preferred embodiment is provided with the back layer B1 and the specular-reflection layer S1, the spin filter effect and the specular effect can be simultaneously obtained, and the free mean paths of the spin-up conduction electrons can be significantly increased. Accordingly, since the difference in free mean path between the spin-up and the spin-down conduction electrons can be significantly increased, the rate of change in magnetoresistance of the spin valve thin-film magnetic element can be significantly improved from a conventionally obtained rate of approximately 8% or less to about 10% or more. Hence, a spin valve thin-film magnetic element can be manufactured that meets the requirement for a narrower track, i.e., for a higher recording density.

In addition, when the magnetization direction of the first pinned magnetic layer 12A and the magnetization direction of the second pinned magnetic layer 12C are placed in an antiparallel state, i.e., in a synthetic-ferri-pinned state, the magnetostatic coupling fields of the first and the second pinned magnetic layers 12A and 12C counteract the demagnetizing (dipole) field by the fixed magnetization of the pinned magnetic layer 12. Accordingly, even though the demagnetizing field (dipole magnetic field) described above has the influence on the rotatable magnetization direction of the free magnetic layer 14, the contribution of the demagnetizing field to the rotatable magnetization of the free magnetic layer 14 can be decreased.

Furthermore, by decreasing the influence of the demagnetizing field (the dipole magnetic field) by the fixed magnetization of the pinned magnetic layer 12 on the free magnetic layer 14, the direction of the rotatable magnetization can be easily controlled in a predetermined direction, and a superior spin valve thin-film magnetic element can be manufactured in which the asymmetry thereof is reduced, whereby the rotatable magnetization direction of the free magnetic layer 14 can be more easily controlled.

FIG. 3 is a cross-sectional view showing the structure of a spin valve thin-film magnetic element according to a second embodiment, which is observed from a side opposing a recording medium. In this second preferred embodiment, a bottom type spin valve thin-film magnetic element is formed having a synthetic-ferri-pinned structure, and a pinned magnetic layer 12 that differs from those shown in the first preferred embodiment. Accordingly, the same reference numerals of the component elements shown in FIGS. 1 and 2 of the first preferred embodiment designate similar component elements of the second embodiment. Accordingly, many common descriptions are omitted.

In this preferred embodiment, the pinned magnetic layer 12 comprises a multilayer film, and as shown in FIG. 3, a second pinned magnetic layer 12C is separated by a specular-reflection layer S2 in the thickness direction (the vertical direction in FIG. 3), thereby forming a structure comprised of three layers. An upper and a lower pinned magnetic layer 12C' and 12C" with the specular-reflection layer S2 positioned therebetween. Preferably, the upper and lower pinned magnetic larger 12C' and 12C" are comprised of a material approximately equivalent to that of the first pinned magnetic layer 12C shown in FIG. 1 of the first embodiment. Preferably, the total thickness of the pinned magnetic layers 12C' and 12C" have an equivalent thickness to $tP_2$ of the first pinned magnetic layer 12C shown in FIG. 2 of the first embodiment.

Similar to the specular-reflection layer S1, the specular-reflection layer S2 forms a potential barrier near the interface with the pinned magnetic layer 12C," and can reflect spin-up conduction electrons moving through a non-magnetic conductive layer 13 and the pinned magnetic layer 12C" near the interface of the pinned magnetic layer 12" and the specular-reflection layer S2 while conserving the spin states of the conduction electrons. As a result, the free mean paths of the spin-up electrons increase, and the specular effect previously described can be obtained.

In this preferred embodiment, the potential barrier at the interface of the pinned magnetic layer 12C" and the specular-reflection layer S2 for reflecting conduction electrons while conserving the spin states comprises the specular-reflection layer S2. The specular-reflection layer S2 comprises half-metal Heusler alloys, such as NiMnSb, and PtMnSb, and the specular-reflection layer S2 may also be comprised of a monolayer film or a multilayer film comprised of at least one of NiMnSb and PtMnSb. As a result, similarly to the specular-reflection layer S1 described above, a specular effect can be obtained at a part of the pinned magnetic layer 12. Accordingly, the free mean paths of the conduction electrons are increased, and a higher rate of change in resistance ($\Delta R/R$) can be obtained in the spin valve thin-film magnetic element.

A film formed of a ferromagnetic half-metal alloy, such as NiMnSb or PtMnSb, exhibits ferromagnetic characteristics, and when the film is disposed between the pinned magnetic layers 12C' and 12C" comprised of ferromagnetic films, which are separated in the thickness direction, the magnetizations of the ferromagnetic layers disposed in the thickness direction are in the same direction. Accordingly, even though a three-layered structure is actually formed, the structure behaves magnetically as a single layer. A specular effect can be obtained in the state in which stable magnetic characteristics can be obtained.

In the embodiment described above, by forming the specular-reflection layer S2 using NiMnSb, PtMnSb, or the like, heat stability can be improved compared to structures in which an oxide is used. In addition, the specular-reflection layer S2 can be easily formed compared to a method for forming an oxide film by oxidation after a metal film is formed.

In addition, since the specular-reflection layer S2 has a minute magnetostatic interaction with the free magnetic layer 14, while a magnetic influence on the free magnetic layer is decreased, a specular effect can be obtained which is equivalent to that obtained by the specular-reflection layer S1.

Figure 6:
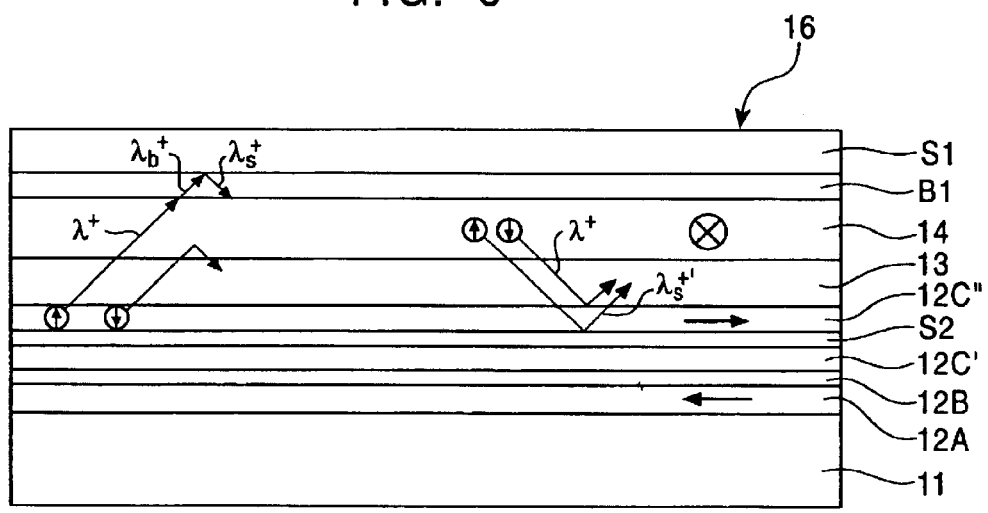
FIG. 6 is a schematic view illustrating the specular effect contribution of the spin valve thin-film magnetic element shown in FIG. 3 having a back layer and a specular-reflection layer.

Hereinafter, the specular effect of the specular-reflection layer S2 will be described. FIG. 6 is a schematic view that explains the spin filter effect and the specular effect in a spin valve thin-film magnetic element having the structure shown in FIG. 5B. In this preferred embodiment, the contribution to the GMR effect by electrons moving from the free magnetic layer 14 toward the second pinned magnetic layer 12C is considered. As described, a spin-up conduction electron, which is generated in the free magnetic layer 14 and which passes through the non-magnetic conductive layer 13, performs specular reflection (specular scattering) near the interface of the pinned magnetic layer 12C" and the specular-reflection layer S2.

As described, since the specular-reflection layer S2 is provided, the free mean path of the spin-up electron increases by a reflection free mean path $\lambda_{+s'}$. Hence, by providing the specular-reflection layer S2, a lower resistance (that is, a longer free mean path) is obtained. Consequently, the resistance of the spin valve thin-film magnetic element is decreased more, and the rate of change in resistance ($\Delta R/R$) can be improved.

According to the spin valve thin-film magnetic element of this preferred embodiment, similar advantages can be obtained as those of the spin valve thin-film magnetic element shown in FIGS. 1 and 2 of the first embodiment. In addition, by providing the specular-reflection layer S2, the rate of change in resistance ($\Delta R/R$) is improved, and hence, the requirement for a narrower track, i.e., a higher recording density, can be achieved.

Figure 4:
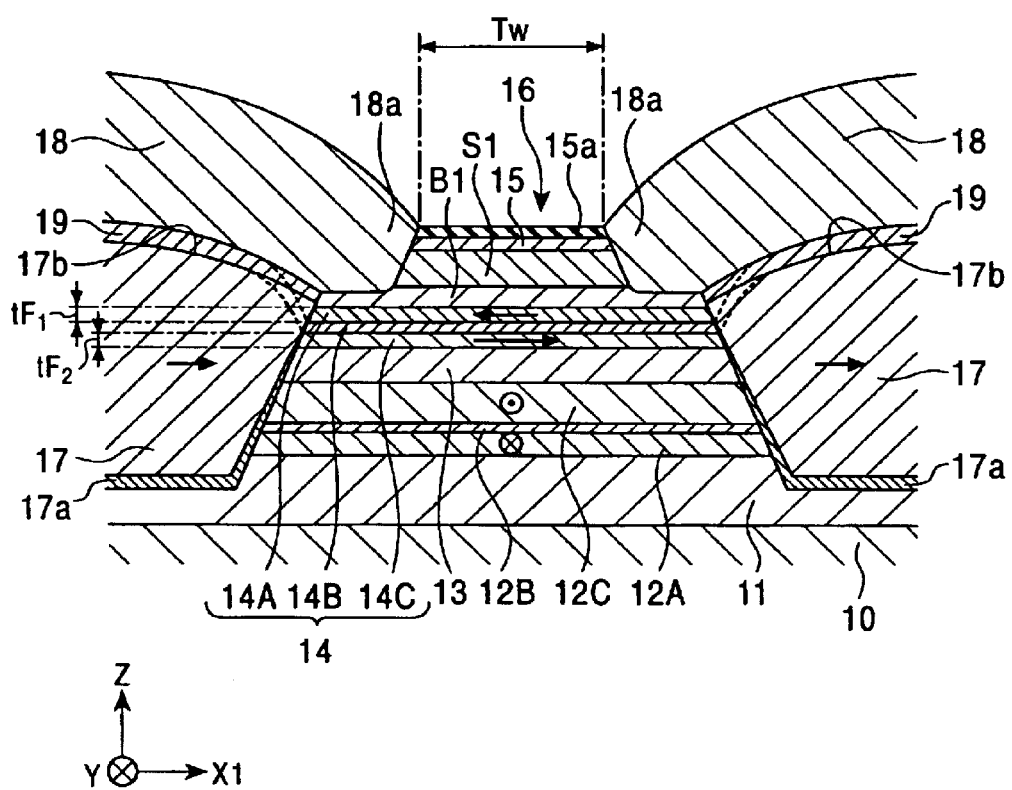
FIG. 4 is a cross-sectional view showing the structure of a spin valve thin-film magnetic element according to a third embodiment, which is illustrated from a side opposing a recording medium.

FIG. 4 is a cross-sectional view showing the structure of a spin valve thin-film magnetic element according to a third preferred embodiment, which is illustrated from a side opposing a recording medium.

Like the first preferred embodiment, the spin valve thin-film magnetic element of third preferred embodiment is a bottom type spin valve thin-film magnetic element comprised of an antiferromagnetic layer positioned below, a pinned magnetic layers positioned below, a non-magnetic conductive layer positioned below, a free magnetic layer on a substrate side. In addition, the pinned magnetic layer is comprised of a first pinned magnetic layer, a second pinned magnetic layer, and a non-magnetic interlayer provided therebetween, in which the magnetization direction of the second pinned magnetic layer is antiparallel to that of the first pinned magnetic layer. Hence, the pinned magnetic layer is placed in a synthetic-ferri-pinned state. That is, the spin valve thin-film magnetic element of the third embodiment is a synthetic-ferri-pinned type single spin valve thin-film magnetic element.

In the spin valve thin-film magnetic element of this third preferred embodiment, the free magnetic layer is comprised of two layers placed in a synthetic ferrimagnetic state, that is, a synthetic ferri-free-type is formed.

In this preferred embodiment, the same reference numerals of the elements shown in FIGS. 1 and 2 of the first preferred embodiment 1 designate similar elements of this third preferred embodiment.

In a laminate 16 of this preferred embodiment, as shown in FIG. 4, a free magnetic layer 14 is comprised of a first free magnetic layer 14A, a second free magnetic layer 14C, and a non-magnetic interlayer 14B positioned therebetween. The first free magnetic layer 14A is positioned adjacent to a back layer B1 sidein contact with the back layer B1, and the second free magnetic layer 14C is positioned adjacent to a non-magnetic conductive layer 13 in contact with the non-magnetic conductive layer 13.

The first free magnetic layer 14A is comprised of a ferromagnetic material and is preferably formed of the same material as that for a first and a second pinned magnetic layer 12A and 12C. For example, a Ni—Fe alloy, Co, a Co—Ni—Fe alloy, a Co—Fe alloy, or a Co—Ni alloy is used, and more preferably, a Ni—Fe alloy is used.

In addition, the non-magnetic interlayer 14B is comprised of a non-magnetic material and is preferably comprised of an element selected from Ru, Rh, Ir, Cr, Re, and Cu, or an alloy thereof. Ru is more preferably used.

The second free magnetic layer 14C is comprised of a ferromagnetic material and is preferably comprised of the same material as that of the first free magnetic layer 14A, first pinned magnetic layers 12A, and the second pinned magnetic layer 12C. For example, a Ni—Fe alloy, Co, a Co—Ni—Fe alloy, a Co—Fe alloy, or a Co—Ni alloy is used, and in particular, a Ni—Fe alloy is preferably used.

In addition, the second free magnetic layer 14C can be formed of a plurality of layers, such as for example, when a Ni—Fe alloy is used. The second free magnetic layer 14C can have a thin Co film at a side in contact with the non-magnetic conductive layer 13.

In addition, a thickness $tF_2$ of the second free magnetic layer 14C is formed larger than a thickness $tF_1$ of the first free magnetic layer 14A. The thickness $tF_2$ of the second free magnetic layer 14C is preferably in the range of about 30 to about 40 Å, and more preferably, in the range of about 35 to about 40 Å. Preferably the thickness $tF_2$ of the second free magnetic layer 14C is not outside of the above range, since the rate of change in resistance ($\Delta R/R$) of the spin valve thin-film magnetic element may not be increased.

The thickness of the first free magnetic layer 14A is preferably in the range of about 5 to about 25 Å. When the saturation magnetizations of the first and the second free magnetic layers 14A and 14C are represented by $M_1$ and $M_2$, respectively, the magnetic film thicknesses of the first and the second free magnetic layers 14A and 14C are $M_1 \cdot tF_1$ and $M_2 \cdot tF_2$, respectively. In addition, the free magnetic layer 14 is formed so that the relationship of the magnetic film thicknesses of the first and the second free magnetic layers 14A and 14B is preferably $M_2 \cdot tF_2 > M_1 \cdot tF_1$. In addition, the first and the second free magnetic layers 14A and 14C are preferably antiferromagnetically coupled together. That is, when the magnetization direction of the second free magnetic layer 14C is aligned in an X1 direction by a bias layer 17, the magnetization direction of the first free magnetic layer 14A is aligned in an opposite direction to the X1 direction.

In this preferred embodiment, since the relationship of the magnetic film thicknesses of the first and the second free magnetic layers 14A and 14B is preferably $M_2 \cdot tF_2 > M_1 \cdot tF_1$, the magnetization of the second free magnetic layer 14C remains at that of the entire free magnetic layer 14. Hence, the magnetization direction is aligned in the X1 direction. The effective film thickness of the free magnetic layer 14 is preferably $(M_2 \cdot tF_2 - M_1 \cdot tF_1)$.

As described, since the first free magnetic layer 14A and the second free magnetic layer 14C are antiferromagnetically coupled with each other so that the magnetization directions thereof are antiparallel to each other, and the relationship of the individual magnetic film thicknesses thereof is set to be $M_2 \cdot tF_2 > M_1 \cdot tF_1$, a synthetic ferrimagnetic state is obtained. Accordingly, the magnetization directions of the first and the second free magnetic layers 14A and 14C are substantially perpendicular to each other. In this preferred embodiment, since the relationship of the magnetic film thicknesses of the first and the second free magnetic layer 14A and 14C is $M_2 \cdot tF_2 > M_1 \cdot tF_1$, a spin flop magnetic field can be increased.

The spin flop magnetic field means the strength of an external magnetic field is parallel to the magnetization direction of one of two magnetic layers in an antiparallel state when the magnetization direction of the other magnetic layer rotates by the effect of the external magnetic field to lose the antiparallel state mentioned above. As a result, the range of the magnetization field is increased in which the free magnetic layer 14 conserves the ferrimagnetic state. Consequently, the free magnetic layer 14 can stably conserve a ferrimagnetic state.

In addition, by optionally controlling the magnetic film thicknesses $M_1 \cdot tF_1$ and $M_2 \cdot tF_2$ of the first and the second free magnetic layer 14A and 14C, respectively, the effective magnetic film thickness $(M_2 \cdot tF_2 - M_1 \cdot tF_1)$ of the free magnetic layer 14 can be decreased. Hence, the magnetization direction of the free magnetic layer 14 can be easily rotated by a minute external magnetic field, which improved the detection sensitivity of the spin valve thin-film magnetic element.

In addition to the advantages of the spin valve thin-film magnetic element of the first preferred embodiment, the spin valve thin-film magnetic element of this preferred embodiment has many advantages. Since the free magnetic layer 14 is a synthetic-ferri-free layer, the magnetization direction of the entire free magnetic layer 14 can be rotated by a minute external magnetic field. Since the thickness of the free magnetic layer 14 itself is not excessively decreased, the sensitivity of the spin valve thin-film magnetic element can be improved.

Accordingly, improvement of the sensitivity to an external magnetic field by the synthetic-ferri-free layer (free magnetic layer 14), the spin filter effect by the back layer B1, and the rate of change in resistance by the specular effect of the specular-reflection layer S1 can be simultaneously improved.

In the preferred embodiment described above, even when the back layer B1 is not formed, a sufficient rate of change in resistance can be obtained. In these preferred embodiments above, a top type spin valve thin-film magnetic element may also be formed in which a free magnetic layer, a non-magnetic conductive layer, a pinned magnetic layer, and antiferromagnetic layer are provided on a substrate side. In these embodiments, the magnetization direction of the free magnetic layer 14 may be aligned in the direction substantially perpendicular to that of the pinned magnetic layer 12 by an exchange bias method using an exchange coupling magnetic field generated in the specular magnetic field S1.

Compared to a hard bias method that has difficulty controlling an effective track width due to the presence of a non-sensitive area, the exchange bias method is a suitable method applied to a spin valve thin-film magnetic element having a narrower track width for performing high-density recording.

Figure 7:
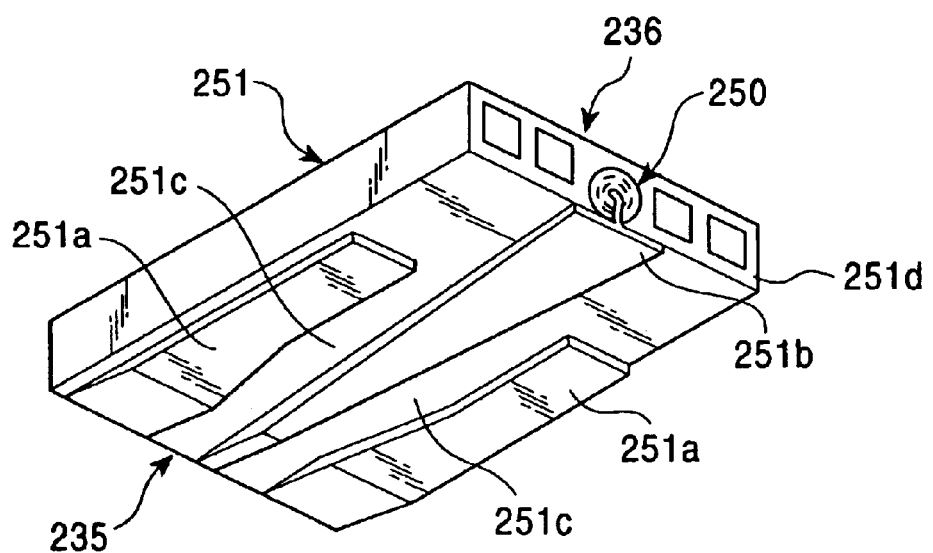
FIG. 7 is a perspective view showing a thin-film magnetic head.

Next, the thin-film magnetic head of the presently preferred embodiment will be described. FIG. 7 is a perspective view showing a preferred embodiment of the thin-film magnetic head. Preferably, the thin-film magnetic head is a floating type thin-film magnetic head mounted on a magnetic recording apparatus, such as a hard disk apparatus. Referring to FIG. 7, in a slider 251 of the thin-film magnetic head, a side indicated by reference numeral 235 is a leading side toward an upstream side of a moving direction of a disk surface, and a side indicated by reference numeral 236 is a trailing side. On the surface of the slider 251 opposing the disc, air bearing surfaces (Air Bearing Surface or ABS, floating surfaces of rail portions) in the rail shape 251a, 251a, 251b and air grooves 251c are formed. Preferably, on an edge surface 251d of the slider 251 at the trailing side, a magnetic core portion 250 is provided.

Figure 8:
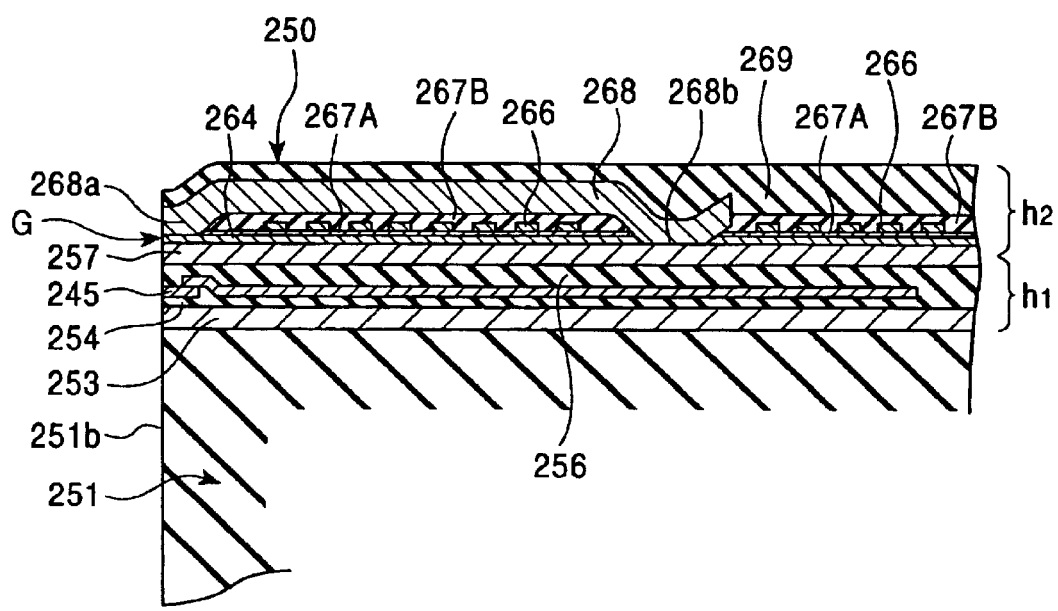
FIG. 8 is a cross-sectional view showing a magnetic core portion of the thin-film magnetic head shown in FIG. 7.
Figure 9:
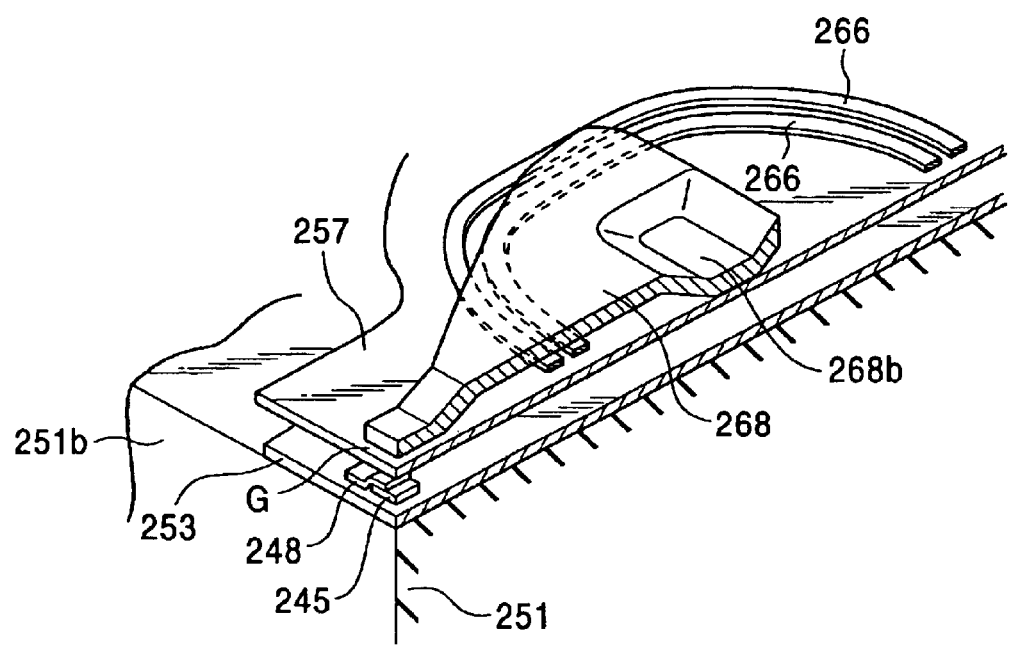
FIG. 9 is a schematic perspective view showing the thin-film magnetic head shown in FIG. 8.

The magnetic core portion 250 of the thin-film magnetic head in this preferred embodiment is a hybrid type magnetic head preferably having the structure shown in FIGS. 8 and 9. On the edge surface 251d of the slider 251 at the trailing side, an MR head (reproducing head) h1, an inductive head (recording head) h2 are sequentially positioned.

In the MR head h1 in this preferred embodiment, a lower gap layer 254 is formed on a lower shield layer 253 comprised of a magnetic alloy positioned at an edge near the trailing side of the slider 251 which is also used as a substrate. Preferably, a magnetoresistance layer 245 is positioned on the lower gap layer 254. On the magnetoresistance layer 245, an upper gap layer 256 is formed, and an upper shield layer 257 is formed thereon. This upper shield layer 257 is also used as a lower core layer of the inductive head h2 provided on the MR head h1.

In the MR head h1, the resistance of the magnetoresistance layer 245 varies in accordance with the presence or the absence of a minute leakage magnetic field from a magnetic recording medium, such as a hard disk. Preferably, the contents recorded in the recording medium is read by detecting the change in resistance.

In the magnetoresistance layer 245 provided in the MR head h1, the spin valve thin-film magnetic element described above is provided. In the preferred embodiment, the spin valve thin-film magnetic element is one of the important component element forming the thin-film magnetic head (reproducing head).

Preferably, in the inductive head h2, a gap layer 264 is formed on the lower core layer 257, and a coil layer 266 having a planar spiral pattern is formed on the gap layer 264. Preferably, the coil layer 266 is surrounded by a first insulating material layer 267A and a second insulating material layer 267B. Preferably, an upper core layer 268 is positioned on the second insulating material layer 267B so that a magnetic pole end portion 268a thereof opposes the lower core layer 257 at an ABS 251b with a magnetic gap G therebetween. As shown in FIGS. 8 and 9, a base portion 268b of the upper core layer 268 is magnetically coupled with the lower core layer 257.

Preferably, on the upper core layer 268, a protective layer 269 comprised of alumina or the like is formed. In the inductive head h2 described above, a recording current is applied to the coil layer 266, and a recording magnetic flux is applied from the coil layer 266 to the core layers. Subsequently, by a leakage magnetic field from the front ends of the lower core layer 257 and the upper core layer 268 at the magnetic gap G, the inductive head h2 records magnetic signals on a magnetic recording medium, such as a hard disk.

Referring to FIG. 8, when the thin-film magnetic head of the present invention is manufactured, the lower gap layer 254 is first formed on the lower shield layer 253 comprised of a magnetic material. Preferably, the spin valve thin-film magnetic element is then formed for forming the magnetoresistance layer 245. Subsequently, the upper shield layer 257 is formed above the spin valve thin-film magnetic element with the upper gap layer 256 provided therebetween to form the MR head (reproducing head) h1.

Next, on the lower core layer 257, which is also used as the upper core layer 257 of the MR head h1, the gap layer 264 is formed. Preferably, the spiral-shaped coil layer 266 is formed on the gap layer 264 so as to be surrounded by the first and the second insulating material layers 267A and 267B. Preferably, the upper core layer 268 is formed on the second insulating material layer 267B, and the protective layer 269 is positioned on the upper core layer 268, thereby forming the thin-film magnetic head.

Since the thin-film magnetic head is provided with the spin valve thin-film magnetic element described above, a thin-film magnetic head can be created having superior heat resistance, reliability, and a small asymmetry. In the presently preferred embodiment, the structures of the slider portion and the inductive head of the thin-film magnetic head are not limited to those structures shown in FIGS. 7 to 9, and it should be understood that many other types of sliders and inductive heads may also be used.

EXAMPLES

In the presently preferred embodiment, by using single spin valve thin-film magnetic elements each provided with a specular-reflection layer comprised of $\alpha$-$Fe_2O_3$ or NiO, the relationships of the coercive force of a free magnetic layer, the strength of an exchange bias magnetic field applied to the free magnetic layer from the specular-reflection layer, and the rate of change in resistance ($\Delta R/R$) with the thicknesses of the free magnetic layer, a back layer, and the specular-reflection layer were measured. The spin valve thin-film magnetic element used for the experiments was a bottom type as shown in FIGS. 1 and 2 of the first and second preferred embodiments, having a synthetic-ferri-pinned type structure in which the pinned magnetic layer was comprised of three layers.

In Example 1, spin valve thin-film magnetic elements were prepared in which back layers comprised of Cu had various thicknesses of about 10 to about 30 Å and in which specular-reflection layers composed of $\alpha$-$Fe_2O_3$ had various thicknesses.

On a substrate having an alumina layer formed thereon as an underlying layer, an underlying layer comprised of Ta, an antiferromagnetic layer comprised of Pt—Mn in which the ratio of Pt to Mn was about 50 to about 50, a first pinned magnetic layer comprised of Co, a non-magnetic interlayer comprised of Ru, a second pinned magnetic layer comprised of Co, a non-magnetic conductive layer comprised of Cu, a free magnetic layer comprised of Co and Ni—Fe in which the ratio of Ni to Fe was about 80 to 20, a back layer comprised of Cu, a specular-reflection layer comprised of $\alpha$-$Fe_2O_3$ were sequentially formed. The individual thicknesses of the films were formed such that an alumina layer of about 1,000 Å thick on a Si substrate, a Ta layer of about 30 Å thick, a Pt—Mn layer of about 150 Å thick, a Co layer of about 15 Å thick, a Ru layer of about 8 Å thick, a Co layer of about 25 Å thick, a Cu layer of about 25 Å thick, a Co layer of about 5 Å thick, a Ni—Fe layer of about 10 to about 50 Å thick, a Cu layer of about 0 to about 20 Å thick, and an $\alpha$-$Fe_2O_3$ layer of about 0 to about 100 Å thick.

In this example, the free magnetic layer was comprised of two layers, i.e., a Co layer and a Ni—Fe layer, and the total thickness of the two layers was about 15 to about 55 Å. For these spin valve thin-film magnetic elements, the relationships of the rate of change in resistance ($\Delta R/R$), the coercive force (Hc) of the free magnetic layer, and the strength of an exchange bias magnetic field (Hb) from the specular-reflection layer to the free magnetic layer with the thicknesses of the free magnetic layer, the back layer, and the specular-reflection layer were measured. The film thickness of the back layer was the dimension in a Z direction shown in FIG. 1.

In Example 1, a spin valve thin-film magnetic element was prepared having a Ta layer about 30 Å thick instead of the specular-reflection layer, and similarly to the above, the relationships of the rate of change in resistance ($\Delta R/R$), and the coercive force (Hc) of a free magnetic layer with the thicknesses of the free magnetic layer, and a back layer were measured.

The results are shown in Table 1.

of the films were formed such that an alumina layer of about 1,000 Å thick on a Si substrate, a Ta layer of about 30 Å thick, a Pt—Mn layer of about 150 Å thick, a Co layer of about 15 Å thick, a Ru layer of about 8 Å thick, a Co layer

TABLE 1

| | THICKNESS OF FREE MAGNETIC LAYER (Å) | THICKNESS OF BACK LAYER (Å) | THICKNESS OF α-Fe$_2$O$_3$ LAYER (Å) | RATE OF CHANGE IN RESISTANCE (ΔR/R) | COERCIVE FORCE OF FREE MAGNETIC LAYER Hc (A/m) | BIAS MAGNETIC FIELD FROM α-Fe$_2$O$_3$ TO FREE MAGNETIC LAYER Hb (A/m) |
|---|---|---|---|---|---|---|
| Conventional Example 1 | 25 | 0 | 0 | 5.8 | 192 | — |
| Example 1 | 25 | 0 | 100 | 11.3 | 240 | 200 |
| | 35 | 0 | 100 | 10.1 | 224 | 96 |
| | 35 | 0 | 50 | 9.9 | 184 | 24 |
| | 15 | 0 | 100 | 6.0 | 808 | 400 |
| | 17 | 0 | 100 | 9.3 | 690 | 320 |
| | 45 | 0 | 100 | 6.2 | 150 | 10 |
| Conventional Example 1 | 25 | 20 | 0 | 7.8 | 176 | — |
| Example 1 | 25 | 20 | 100 | 9.6 | 160 | 24 |
| | 25 | 10 | 100 | 9.9 | 168 | 56 |
| | 25 | 10 | 50 | 10.1 | 224 | 8 |
| | 35 | 10 | 50 | 9.4 | 152 | 8 |
| | 55 | 10 | 100 | 7.5 | 144 | 0 |
| | 18 | 10 | 100 | 11.2 | 235 | 68 |
| | 45 | 10 | 100 | 8.1 | 140 | 0 |

Table 1 shows the relationships of the rate of change in resistance (ΔR/R), the coercive force (Hc) of the free magnetic layer, and the strength of the exchange bias magnetic field (Hb) from the specular-reflection layer to the free magnetic layer with the thicknesses of the free magnetic layer, the back layer, and the specular-reflection layer (α-Fe$_2$O$_3$). In Example 1 and Example 2, spin valve thin-film magnetic elements were prepared having back layers comprised of Cu had various thicknesses of about 10 to about 30 Å and in which specular-reflection layers comprised of NiO had various thicknesses.

On a substrate having an alumina layer formed thereon as an underlying layer, an underlying layer comprised of Ta, an antiferromagnetic layer comprised of Pt—Mn in which the ratio of Pt to Mn was about 50 to about 50, a first pinned magnetic layer comprised of Co, a non-magnetic interlayer comprised of Ru, a second pinned magnetic layer comprised of Co, a non-magnetic conductive layer comprised of Cu, a free magnetic layer comprised of Co and Ni—Fe in which the ratio of Ni to Fe was about 80 to about 20, a back layer comprised of Cu, a specular-reflection layer comprised of NiO were sequentially formed. The individual thicknesses of the films were formed such that an alumina layer of about 1,000 Å thick on a Si substrate, a Ta layer of about 30 Å thick, a Pt—Mn layer of about 150 Å thick, a Co layer of about 15 Å thick, a Ru layer of about 8 Å thick, a Co layer of about 25 Å thick, a Cu layer of about 25 Å thick, a Co layer of about 5 Å thick, a Ni—Fe layer of about 10 to about 50 Å thick, a Cu layer of about 0 to about 20 Å thick, and a NiO layer of about 0 to about 100 Å thick.

For these spin valve thin-film magnetic elements, the relationships of the rate of change in resistance (ΔR/R), the coercive force (Hc) of the free magnetic layer, and the strength of an exchange bias magnetic field (Hb) from the specular-reflection layer to the free magnetic layer with the thicknesses of the free magnetic layer, the back layer, and the specular-reflection layer were measured. The film thickness of the back layer was the dimension in the Z direction in FIG. 1.

Next in Example 2, a spin valve thin-film magnetic element was prepared comprising a Ta layer of about 30 Å thick instead of the specular-reflection layer. The relationships of the rate of change in resistance (ΔR/R), and the coercive force (Hc) of a free magnetic layer with the thicknesses of the free magnetic layer, and a back layer were measured.

The results are shown in Table 2.

TABLE 2

| | THICKNESS OF FREE MAGNETIC LAYER (Å) | THICKNESS OF BACK LAYER (Å) | THICKNESS OF NiO LAYER (Å) | RATE OF CHANGE IN RESISTANCE (ΔR/R) | COERCIVE FORCE OF FREE MAGNETIC LAYER Hc (A/m) | BIAS MAGNETIC FIELD FROM NiO TO FREE MAGNETIC LAYER Hb (A/m) |
|---|---|---|---|---|---|---|
| Conventional Example 2 | 25 | 0 | 0 | 5.8 | 192 | — |
| Example 2 | 25 | 0 | 100 | 9.6 | 224 | 832 |
| | 35 | 0 | 100 | 8.9 | 192 | 42.4 |
| | 35 | 0 | 50 | 8.5 | 168 | 48 |
| | 15 | 0 | 100 | 5.9 | 704 | 1,624 |
| | 18 | 0 | 100 | 9.0 | 630 | 930 |
| | 45 | 0 | 100 | 8.0 | 162 | 30 |

TABLE 2-continued

|  | THICKNESS OF FREE MAGNETIC LAYER (Å) | THICKNESS OF BACK LAYER (Å) | THICKNESS OF NiO LAYER (Å) | RATE OF CHANGE IN RESISTANCE (ΔR/R) | COERCIVE FORCE OF FREE MAGNETIC LAYER Hc (A/m) | BIAS MAGNETIC FIELD FROM NiO TO FREE MAGNETIC LAYER Hb (A/m) |
|---|---|---|---|---|---|---|
| Conventional Example 2 | 25 | 20 | 0 | 7.8 | 176 | — |
| Example 2 | 25 | 20 | 100 | 8.9 | 168 | 56 |
|  | 25 | 10 | 100 | 9.1 | 160 | 200 |
|  | 25 | 10 | 50 | 8.8 | 152 | 24 |
|  | 35 | 10 | 50 | 9.0 | 144 | 24 |
|  | 55 | 10 | 100 | 7.4 | 136 | 16 |
|  | 17 | 10 | 100 | 9.2 | 210 | 340 |
|  | 45 | 10 | 100 | 8.0 | 141 | 18 |

As shown in Table 2, in the presently preferred embodiment, by providing the specular-reflection layer comprised of $\alpha$-$Fe_2O_3$ or NiO, the rate of change in resistance was improved from approximately 5 to about 6% to about 10% or more.

In the case described above in which the rate of change in resistance was improved, the film thickness of the free magnetic layer was about 15 to about 45 Å. Hence, it is understood that the thickness thereof was preferably in the range mentioned above. In addition, it is also understood that the rate of change in resistance was improved when the thickness of the back layer was in the range of about 5 to about 30 Å.

Accordingly, by virtue of the specular effect of the specular-reflection layer and the spin filter effect of the back layer, the rate of change in resistance is improved, and hence, the output characteristics of the spin valve thin-film magnetic element can be improved.

The spin valve thin-film magnetic element of the presently preferred embodiment, the manufacturing method therefor, and the thin-film magnetic head provided with this spin valve thin-film magnetic element have the following advantages.

(1) Since the specular-reflection layer is positioned from the non-magnetic conductive layer than the free magnetic layer, which increases the free mean paths of conduction electrons by a specular effect, the free mean paths of +spin electrons (spin-up electrons) are increased which contribute to the magnetoresistance effect. Hence, a high rate of change in resistance ($\Delta R/R$) in the spin valve thin-film magnetic element can be obtained by a specular effect, whereby a higher recording density can be achieved.

(2) Since the film thickness of the free magnetic layer is set in the range of about 15 to about 45 Å, a decrease in rate of change in resistance can be prevented.

(3) The antiferromagnetic layer and the vertical bias layers may comprise an alloy comprised of Mn and at least one element selected from the group consisting of Pt, Pd, Rh, Ru, Ir, Os, Au, Ag, Cr, Ni, Ne, Ar, Xe, and Kr, or may comprise an alloy represented by the formula X—Mn in which X is one element selected from the group consisting of Pt, Pd, Ru, Ir, Rh, and Os and in which X is preferably in the range of about 37 to about 63 atomic percent. In addition, in the spin valve thin-film magnetic element described above, the antiferromagnetic layer may comprise an alloy represented by the formula Pt—Mn—X' in which X' is at least one element selected from the group consisting of Pd, Cr, Ru, Ni, Ir, Rh, Os, Au, Ag, Ne, Ar, Xe, and Kr and in which X'+Pt is preferably in the range of about 37 to about 63 atomic percent. Accordingly, when an antiferromagnetic layer is formed of an alloy represented by the formula X—Mn or an alloy represented by the formula Pt—Mn—X', compared to a spin valve thin-film magnetic element having an antiferromagnetic layer comprised of a NiO alloy, a Fe—Mn alloy, a Ni—Mn alloy, or the like, a spin valve thin-film magnetic element can be produced having superior characteristics, such as a strong exchange coupling magnetic field, a high blocking temperature, and superior corrosion resistance.

(4) As an insulating material forming the specular-reflection layer, when an oxide or the like is used, for example, $\alpha$-$Fe_2O_3$, NiO, CoO, Co—Fe—O, Co—Fe—Ni—O, $Al_2O_3$, Al—Q—O in which Q is at least one element selected from the group consisting of B, Si, N, Ti, V, Cr, Mn, Fe, Co, and Ni, or R—O in which R is at least one element selected from the group consisting of Ti, V, Cr, Zr, Nb, Mo, Hf, Ta, and W, a high energy gap can be formed having a high probability of producing specular reflection which conserves spin states of the conduction electrons. Hence, the rate of change in resistance can be improved by the specular effect.

(5) As an insulating material for forming the specular-reflection layer, a half-metal Heusler alloy may also be used, and the specular-reflection layer may be a monolayer film or a multilayer film comprised of the half-metal Heusler alloy comprising at least NiMnSb or PtMnSb. When these materials are used, a sufficiently high potential barrier between the specular-reflection layer and a layer adjacent thereto can be formed, and as a result, a sufficient specular effect can be obtained.

(6) When the film thickness of the specular-reflection layer is preferably set in the range of about 10 to about 400 Å, and more preferably, in the range of about 10 to about 200 Å, the specular-reflection layer is not allowed to serve as an antiferromagnetic layer, and when a thin-film magnetic device is formed using the specular-reflection layer described above, the degradation of resolution of the head, i.e., an excessive increase in shield distance used as the reproducing gap, can be prevented, whereby the rate of change in resistance can be improved.

(7) Since the back layer comprised of a non-magnetic conductive material selected from the group consisting of Au, Ag, and Cu is provided between the free magnetic layer and the specular-reflection layer, the mean free paths of +spin (spin-up) conduction electrons are increased which contribute to the magnetoresistance effect. Consequently, a high rate of change in resistance ($\Delta R/R$) can be obtained in the spin valve thin-film magnetic element by a spin filter effect. Hence, a higher recording density can be achieved.

(8) The thickness of the back layer is preferably in the range of about 5 to about 30 Å, and more preferably, in the range of about 5 to about 15 Å. As a result, a high rate of change in resistance ($\Delta R/R$) can be obtained.

(9) Since the pinned magnetic layer of the presently preferred embodiment is comprised of a multilayer film, and at least one layer thereof is a monolayer film or a multilayer film comprised of a half-metal Heusler alloy comprising at least one of NiMnSb and PtMnSb, a specular effect can be obtained in a part of the pinned magnetic layer. Consequently, a higher rate of change in resistance (ΔR/R) can be obtained in the spin valve thin-film magnetic element by an increase in free mean paths of conduction electrons.

When a half-metal alloy, such as NiMnSb, or PtMnSb, exhibiting ferromagnetic characteristics is disposed between ferromagnetic films comprising the pinned magnetic layer, the multilayer film behaves as a monolayer film does even though the multilayer film actually has a three-layered structure, since the magnetizations of the ferromagnetic layers in the vertical direction are in the same direction. Accordingly, a specular effect can be obtained in the state in which stable magnetic characteristics can be obtained.

(10) A synthetic-ferri-pinned type spin valve thin-film magnetic element may be formed in which the pinned magnetic layer is formed of a first pinned magnetic layer at the antiferromagnetic layer side and a second pinned magnetic layer formed on the first pinned magnetic layer with a non-magnetic interlayer positioned therebetween and in which the magnetization directions of the first and the second pinned magnetic layers are antiparallel to each other so that the pinned magnetic layer is placed in a ferrimagnetic state. Accordingly, an exchange coupling magnetic field (an exchange anisotropic magnetic field) Hex generated at the interface of the antiferromagnetic layer and the first pinned magnetic layer can be increased. Preferably one of the first and the second pinned magnetic layers serves to fix the magnetization of the other pinned magnetic layer in an appropriate direction. Hence, the entire pinned magnetic layer is conserved in a very stable state.

In addition, when a spin valve thin-film magnetic element is formed having a pinned magnetic layer comprised of a first and a second pinned magnetic layers with a non-magnetic interlayer positioned therebetween, the magnetostatic coupling fields of the first and the second pinned magnetic layers can counteract a demagnetizing or dipole field by the fixed magnetization of the pinned magnetic layer. Accordingly, the influence of the demagnetizing field, generated by the fixed magnetization of the pinned magnetic layer, to the direction of the rotatable magnetization of the free magnetic layer can be decreased.

(11) The pair of electrode layers may be positioned at least two sides of the free magnetic layer, the non-magnetic conductive layer, and the pinned magnetic layer in the film surface direction thereof and may be disposed further from the substrate than the antiferromagnetic layer. As a result, the ratio of a sense current directly supplied in the vicinity of the free magnetic layer exhibiting the GMR effect can be increased without flowing through the antiferromagnetic layer, the specular-reflection layer, and the vertical bias layer, which have higher resistances compared to the free magnetic layer or the non-magnetic conductive layer. Hence, the rate of change in magnetic resistance in the spin valve thin-film magnetic element can be more improved. In addition, since a sense current can be directly supplied in the vicinity of the free magnetic layer from the electrode layers while conserving the single domain state of the free magnetic layer, side reading can be prevented, and a higher magnetic recording density can be more effectively achieved.

(12) When a spin valve thin-film magnetic element is formed having a free magnetic layer comprised of two films with a non-magnetic interlayer provided therebetween, an exchange coupling magnetic field is generated between the two films constituting the free magnetic layer so that the free magnetic layer is placed in a ferrimagnetic state, and the magnetization direction of the free magnetic layer can sensibly rotates in accordance with an external magnetic field.

(13) Furthermore, a thin-film magnetic head having the spin valve thin-film magnetic can resolve many of the problems described above.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A spin valve thin-film magnetic element comprising:
    a substrate;
    an antiferromagnetic layer disposed on the substrate;
    a pinned magnetic layer, a first magnetization direction of the pinned magnetic layer being fixed by an exchange coupling magnetic field with the antiferromagnetic layer;
    a first non-magnetic conductive layer disposed between the pinned magnetic layer and a free magnetic layer;
    a pair of electrode layers configured to supply a sense current to the pinned magnetic layer, the first non-magnetic conductive layer, and the free magnetic layer;
    a bias layer aligning a second magnetization direction of the free magnetic layer in a direction substantially perpendicular to the first magnetization direction; and
    a specular-reflection layer, positioned further from the non-magnetic conductive layer than the free magnetic layer,
    wherein the free magnetic layer comprises a first free magnetic layer, a second free magnetic layer, and a second non-magnetic conductive layer disposed between the first and the second free magnetic layers, the second free magnetic layer having a thickness in the range of approximately 30 angstroms to approximately 40 angstroms, and the first free magnetic layer having a thickness in the range of approximately 5 angstroms to approximately 25 angstroms.

2. A spin valve thin-film magnetic element according to claim 1, wherein the antiferromagnetic layer comprises one of an X—Mn alloy and a Pt—Mn—X' alloy, in which X is one element selected from the group consisting of Pt, Pd, Ir, Rh, Ru, and Os, and X' is at least one element selected from the group consisting of Pd, Cr, Ru, Ni, Ir, Rh, Os, Au, Ag, Ne, Ar, Xe, and Kr.

3. A spin valve thin-film magnetic element according to claim 1, wherein the specular-reflection layer comprises an insulating material configured to generate an energy gap having a high probability of producing specular reflection which conserves spin states of the conduction electrons.

4. A spin valve thin-film magnetic element according to claim 3, wherein the specular-reflection layer comprises an oxide.

5. A spin valve thin-film magnetic element according to claim 3, wherein the specular-reflection layer comprises one of $\alpha\text{-Fe}_2\text{O}_3$ and NiO.

6. A spin valve thin-film magnetic element according to claim 1, wherein a thickness of the specular-reflection layer is within the range of about 10 to about 400 Å.

7. A spin valve thin-film magnetic element according to claim 6, wherein the film thickness of the specular-reflection layer is within the range of about 10 to about 200 Å.

8. A spin valve thin-film magnetic element according to claim 1, wherein at least the antiferromagnetic layer directly underlies the pinned magnetic layer that underlies the first non-magnetic conductive layer that directly underlies the free magnetic layer that directly underlies the specular-reflection layer.

9. A spin valve thin-film magnetic element according to claim 1, wherein the free magnetic layer and the specular-reflection layer are separated by a back layer, comprising a non-magnetic conductive material.

10. A spin valve thin-film magnetic element according to claim 9, wherein the back layer comprises a material comprising an element selected from the group consisting of Au, Ag, and Cu.

11. A spin valve thin-film magnetic element according to claim 9, wherein a film thickness of the back layer is within the range of about 5 to about 15 Å.

12. A spin valve thin-film magnetic element according to claim 1, wherein the pinned magnetic layer is a multilayer film, and at least one layer of the multilayer film comprises a half-metal Heusler alloy.

13. A spin valve thin-film magnetic element according to claim 1, wherein the pinned magnetic layer comprises a first pinned magnetic layer, a second pinned magnetic layer, and a non-magnetic interlayer disposed therebetween, and the first and the second pinned magnetic layers are in a ferrimagnetic state having magnetization directions antiparallel to each other.

14. A spin valve thin-film magnetic head according to claim 1, wherein the free magnetic layer and the specular-reflection layer are separated by a back layer and a portion of the pair of electrode layers is directly adjacent to an upper surface of the back layer.

15. A spin valve thin-film magnetic element according to claim 14, wherein the pair of electrode layers is located further from the substrate than the antiferromagnetic layer.

16. A spin valve thin-film magnetic element according to claim 1, wherein at least the antiferromagnetic layer, the pinned magnetic layer, the free magnetic layer, and the specular-reflection layer comprise a laminate, and the pair of electrode layers is provided at the two sides of the laminate and extend toward the laminate in direct contact with the free magnetic layer.

17. A spin valve thin-film magnetic element according to claim 9, wherein at least the antiferromagnetic layer, the pinned magnetic layer, the free magnetic layer, and the specular-reflection layer comprise a laminate, and the pair of electrode layers is provided at two sides of the laminate and extend toward the laminate in direct contact with the back layer.

18. A spin valve thin-film magnetic element according to claim 10, wherein a thickness of the back layer is in the range of about 5 to about 15 Å.

19. A spin valve thin-film magnetic element according to claim 12, wherein the half-metal Heusler alloy comprises at least one of NiMnSb and PtMnSb, and the layer comprising the half-metal Heusler alloy is one of a monolayer film and a multilayer film.

20. A spin valve thin-film magnetic element comprising:
a substrate;
an antiferromagnetic layer disposed on the substrate;
a pinned magnetic layer comprising a non-magnetic interlayer disposed between a first and a second pinned layer, the first pinned layer positioned in contact with the antiferromagnetic layer, a first magnetization direction of the first pinned magnetic layer being fixed by an exchange coupling magnetic field with the antiferromagnetic layer, the second pinned layer comprising a lower pinned layer and an upper pinned layer having a specular layer disposed therebetween;
a first non-magnetic conductive layer disposed between the pinned magnetic layer and a free magnetic layer, the free magnetic layer comprising a first free magnetic layer, a second free magnetic layer, and a second non-magnetic conductive layer disposed between the first and the second free magnetic layers, the second free magnetic layer having a thickness in the range of approximately 30 angstroms to approximately 40 angstroms, and the first free magnetic layer having a thickness in the range of approximately 5 angstroms to approximately 25 angstroms; a pair of electrode layers configured to supply a sense current to the pinned magnetic layer, the first non-magnetic conductive layer, and the free magnetic layer, and
a bias layer aligning the second magnetization direction in a direction substantially perpendicular to the first magnetization direction; and
wherein the specular-reflection layer comprises a multilayer film, one layer of the multilayer film further comprising a half-metal Heusler alloy.

21. A spin valve thin-film magnetic element according to claim 20, wherein the half-metal Heusler alloy comprises at least one of NiMnSb and PtMnSb, and the layer comprising the half-metal Heusler alloy is one of a monolayer film and a multilayer film.

22. A spin valve thin-film magnetic element comprising:
an antiferromagnetic layer;
a pinned magnetic layer coupled to the antiferromagnetic layer, a magnetization direction of the pinned magnetic layer being fixed by an exchange coupling magnetic field with the antiferromagnetic layer;
a non-magnetic conductive layer disposed between the pinned magnetic layer and a free magnetic layer;
a pair of electrodes configured to supply a current to the pinned magnetic layer, the non-magnetic conductive layer, and the free magnetic layer;
a specular-reflection layer comprised of a half-metal Heusler alloy positioned further from the non-magnetic conductive layer than the free magnetic layer; and
a bias layer aligning the magnetization direction of the free magnetic layer to the magnetization direction of the pinned magnetic layer.

23. A spin valve thin-film magnetic element comprising:
a substrate;
an antiferromagnetic layer disposed on the substrate;
a pinned magnetic layer in contact with the antiferromagnetic layer, a first magnetization direction of the pinned magnetic layer being fixed by an exchange coupling magnetic field with the antiferromagnetic layer;
a non-magnetic conductive layer disposed between the pinned magnetic layer and a free magnetic layer;
a pair of electrode layers configured to supply a sense current to the pinned magnetic layer, the non-magnetic conductive layer, and the free magnetic layer;
a bias layer aligning a second magnetization direction of the free magnetic layer in a direction substantially perpendicular to the first magnetization direction; and
a specular-reflection layer, positioned further from the non-magnetic conductive layer than the free magnetic layer;
wherein the specular-reflection layer comprises an insulating material that comprises a half-metal Heusler alloy.

24. A spin valve thin-film magnetic element according to claim 23, wherein the half-metal Heusler alloy comprises at least one of NiMnSb and PtMnSb, and the specular-reflection layer is one of a monolayer film and a multilayer film.

25. A spin valve thin-film magnetic element comprising:

a substrate;

an antiferromagnetic layer disposed on the substrate;

a pinned magnetic layer being in contact with the antiferromagnetic layer, a first magnetization direction of the pinned magnetic layer being fixed by an exchange coupling magnetic field with the antiferromagnetic layer;

a first non-magnetic conductive layer disposed between the pinned magnetic layer and a free magnetic layer, the free magnetic layer comprising a first free magnetic layer, a second free magnetic layer, and a second non-magnetic conductive layer disposed between the first and the second free magnetic layers, the second free magnetic layer having a thickness in the range of approximately 30 angstroms to approximately 40 angstroms, and the first free magnetic layer having a thickness in the range of approximately 5 angstroms to approximately 25 angstroms;

a pair of electrode layers configured to supply a sense current to the pinned magnetic layer; the first non-magnetic conductive layer, and the free magnetic layer; and a bias layer aligning a second magnetization direction of the free magnetic layer in a direction substantially perpendicular to the first magnetization direction.

* * * * *